United States Patent [19]

Kostinko

[11] Patent Number: 4,612,342

[45] Date of Patent: Sep. 16, 1986

[54] RUBBER COMPOSITIONS CONTAINING SMALL PARTICLE SIZE ZEOLITES

[75] Inventor: John Kostinko, Bel Air, Md.

[73] Assignee: J. M. Huber Corporation, Locust, N.J.

[21] Appl. No.: 619,445

[22] Filed: Jun. 11, 1984

Related U.S. Application Data

[63] Continuation-in-part of Ser. No. 557,377, Dec. 1, 1983, abandoned, which is a continuation of Ser. No. 349,787, Feb. 18, 1982, abandoned, which is a continuation of Ser. No. 93,345, Nov. 21, 1979, abandoned, which is a continuation-in-part of Ser. No. 88,243, Oct. 25, 1979, abandoned, which is a continuation-in-part of Ser. No. 971,584, Dec. 20, 1978, Pat. No. 4,235,836, which is a continuation-in-part of Ser. No. 572,122, Jan. 17, 1984, abandoned, which is a continuation of Ser. No. 274,898, Jun. 18, 1981, abandoned, said Ser. No. 274,898, is a continuation-in-part of Ser. No. 189,419, Sep. 22, 1980, abandoned.

[51] Int. Cl.$^4$ ................................................ C08K 3/34
[52] U.S. Cl. ..................................... 524/450; 524/52; 524/413; 524/525; 524/526
[58] Field of Search .......................................... 524/450

[56] References Cited

U.S. PATENT DOCUMENTS

| | | |
|---|---|---|
| 2,882,243 | 4/1959 | Milton . |
| 2,882,244 | 4/1959 | Milton . |
| 2,979,381 | 4/1961 | Gottstine et al. . |
| 3,036,980 | 5/1962 | Dunham et al. .................... 524/450 |
| 3,058,805 | 10/1962 | Weber . |
| 3,266,973 | 8/1966 | Crowley . |
| 3,382,141 | 5/1968 | Arledter et al. . |
| 3,433,588 | 3/1969 | Michel et al. . |
| 3,433,589 | 3/1969 | Ciric . |
| 3,516,786 | 6/1970 | Maher et al. . |
| 3,755,222 | 8/1973 | Gruber et al. ...................... 524/450 |
| 3,808,326 | 4/1974 | McDaniel et al. . |
| 3,985,669 | 10/1976 | Krummel et al. . |
| 4,041,135 | 8/1977 | Williams et al. . |
| 4,055,622 | 10/1977 | Christophliemk et al. . |
| 4,066,394 | 1/1978 | Leonard . |
| 4,071,377 | 1/1978 | Schwuger et al. . |
| 4,073,867 | 2/1978 | Roebke et al. . |
| 4,094,778 | 6/1978 | Denny et al. . |
| 4,150,100 | 4/1979 | Kettinger et al. . |
| 4,166,099 | 8/1979 | McDaniel et al. . |
| 4,235,856 | 11/1980 | Kostinko . |
| 4,264,562 | 4/1981 | Kostinko . |
| 4,271,135 | 6/1981 | Wuest et al. . |
| 4,303,629 | 12/1981 | Strack et al. . |
| 4,314,979 | 2/1982 | Deabriges . |

FOREIGN PATENT DOCUMENTS

| | | |
|---|---|---|
| 0034143 | 2/1982 | Japan ................................. 524/450 |
| 1049363 | 11/1966 | United Kingdom . |
| 1223592 | 2/1971 | United Kingdom . |
| 1232429 | 5/1971 | United Kingdom . |
| 1402933 | 8/1975 | United Kingdom . |
| 1476957 | 6/1977 | United Kingdom . |
| 1498213 | 1/1978 | United Kingdom . |
| 1525775 | 9/1978 | United Kingdom . |
| 2002335 | 2/1979 | United Kingdom . |
| 1548152 | 7/1979 | United Kingdom . |

OTHER PUBLICATIONS

Meise W. et al., "Kinetic Studies on the Formation of Zeolite A", *Molecular Sieves*, 1973, pp. 169–178.

*Primary Examiner*—Herbert J. Lilling
*Attorney, Agent, or Firm*—Harold H. Flanders; Robert L. Price

[57] ABSTRACT

Rubber compositions which contain zeolite particles having particle sizes of no more than 1.6 microns in diameter with at least 90% of the weight of the particles being between 0.1 and 3.2 microns in diameter, a binding agent, water, and a solubilizing agent.

5 Claims, No Drawings

RUBBER COMPOSITIONS CONTAINING SMALL PARTICLE SIZE ZEOLITES

CROSS-REFERENCE TO RELATED APPLICATIONS

This application is a continuation-in-part of copending U.S. application Ser. No. 557,377, filed Dec. 1, 1983 now abandoned; which is a continuation of Ser. No. 349,787, filed Feb. 18, 1982, now abandoned; which is a continuation of Ser. No. 093,345, filed Nov. 21, 1979, now abandoned; which is a continuation-in-part of Ser. No. 088,243, filed Oct. 25, 1979, now abandoned; which is a continuation-in-part of Ser. No. 971,584, filed Dec. 20, 1978, now U.S. Pat. No. 4,235,836. This application is also a continuation-in-part of copending application Ser. No. 572,122, filed Jan. 17, 1984 now abandoned; which is a continuation of Ser. No. 274,898, filed June 18, 1981, now abandoned; which is a continuation-in-part of Ser. Nos. 093,345, 088,243, and 971,584, previously listed, and which said application Ser. No. 274,898 is also a continuation-in-part of copending application Ser. No. 189,419, filed Sept. 22, 1980 now abandoned, which is a continuation-in-part of Ser. Nos. 093,345, 088,243, and 971,584, previously listed.

TECHNICAL FIELD

The present invention relates to the production of zeolites and, more specifically, to processes for the production of zeolites of small and uniform particle size, processes for making zeolite Y, and compositions containing these zeolites.

BACKGROUND ART

Naturally occurring hydrated metal aluminum silicates are called zeolites and are well known in the art as synthetic absorbents. The most common of these zeolites are sodium alumino zeolites. Zeolites consist basically of a three-dimensional framework of $SiO_4$ and $AlO_4$ Tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al_2/Na_2=1$. The spaces between the tetrahedra are occupied by water molecules prior to dehydration. The main products of these types are known in the art as zeolite A, zeolite X, and zeolite Y.

Zeolites A, X, and Y may be distinguished from other zeolites and silicates on the basis of their x-ray powder diffraction patterns and certain physical characteristics. The composition and density are among the characteristics which have been found to be important in identifying these zeolites.

The basic formula for all crystalline sodium zeolites may be represented as follows:

$$Na_2O:Al_2O_3:xSiO_2:yH_2O$$

wherin the values for x and y fall in a definite range. The value x for a particular zeolite will vary somewhat since the aluminum atoms and the silicon atoms occupy essentially equivalent positions in the lattice. Minor variations in the relative numbers of these atoms does not significantly alter the crystal structure or physical properties of the zeolite. For zeolite A, an average value for x is about 1.85 with the x value falling within the range 1.85±0.5. For zeolite X, the x value falls within the range 2.5±0.5.

The formula for zeolite A may be written as follows:

$$1.0\pm0.2Na_2O:Al_2O_3:1.85\pm0.5SiO_2:yH_2O$$

The formula for zeolite X may be written as follows:

$$0.9\pm0.2Na_2O:Al_2O_3:2.5\pm SiO_2:yH_2O$$

The formula for zeolite Y may be written as follows:

$$0.9\pm0.2Na_2O:Al_2O_3:4.5\pm1.5SiO_2:yH_2O$$

wherein y may be any value up to 6 for zeolite A, any value up to 8 for zeolite X, and any value up to 9 for zeolite Y.

In zeolites synthesized according to the preferred art procedure, the ratio sodium oxide to alumina should equal one. But if all the excess sodium present in the mother liquor is not washed out of the precipitated product, analysis may show a ratio greater than one, and if the washing is carried too far, some sodium may be ion exchanged by hydrogen, and the ratio will drop below one. It has been found that due to the ease with which hydrogen exchange takes place, the ratio for zeolite A lies in the range of $$\frac{\text{Sodium oxide}}{\text{Alumina}} = 1.0 \pm 0.2$$

Thus the formula for zeolite A may be written as follows:

$$1.0\pm0.2Na_2O:Al_2O_3:1.85\pm0.5SiO_2:yH_2O$$

Zeolite A is disclosed and claimed in U.S. Pat. No. 2,882,243, entitled "Molecular Sieve Adsorbents," issued to Robert M. Milton on Apr. 14, 1959. This patent discloses a process for producing zeolite A wherein a sodium-aluminum-silicate water mixture is prepared having a water to sodium oxide ratio of from 35:1 to 200:1, a sodium oxide to silica ratio of from 0.8:1 to 3:1, and a silica to alumina ratio of from 0.5:1 to 2.5:1. This mixture is maintained at a temperature of from 20 to 175 degrees Celsius until zeolite A is formed.

The particle size of a zeolite affects the x-ray diffraction pattern of that zeolite. When the particle size of a zeolite is reduced, the intensities of peak heights in the zeolite's x-ray diffraction pattern is also reduced. The x-ray diffraction pattern does not change, except that the intensity of each peak height is reduced.

The identity of a zeolite of small particle size can be determined by comparison of its x-ray diffraction pattern with that of a standard zeolite. The patterns should match, except that the intensities of the peak heights of the pattern of the small particle size zeolite will be smaller than the intensities of the peak heights of the pattern of the standard zeolite.

The particle size of zeolites is discussed in Breck, D. W. *Zeolite Molecular Sieves.* N.Y., John Wiley & Sons, 1974, pgs. 384–388. TP159.M6B7. He states that particle sizes of the individual crystals of zeolite range from 1 to 10 microns. He shows the particle size distribution of a typical zeolite sodium A powder having a weight average diameter of 2.78 microns and shows a histrogram of the particle size distribution of a zeolite A preparation.

From the histrogram it can be seen that less than 35% of the particles have a diameter of less than 2 microns.

The particle size of zeolites is also discussed in Meier and Uytterhoeven *Molecular Sieves,* 1973, pgs. 169-178. This book shows a relationship between the crystal diameter and the water to sodium oxide ratio. It also shows the influence of the silica source on crystallization time.

Zeolite A and its method of preparation is also described in the following U.S. Patents wherein the invention resides in the method of preparation.

U.S. Pat. No. 2,982,612
U.S. Pat. No. 3,058,805
U.S. Pat. No. 3,101,251
U.S. Pat. No. 3,119,659
U.S. Pat. No. 4,041,135

The oxide ratios for zeolite A production in the above patents is as follows:

| PRIOR ART OXIDE RATIOS FOR MAKING ZEOLITE A | | | | |
|---|---|---|---|---|
| Patent | Water/ Sodium Oxide | Sodium Oxide/ Silica | Silica/ Alumina | Temperature |
| 2,882,243 | 35-200 | 0.8-3 | 0.5-2.5 | 20-175 |
| 2,982,612 | 130-300 | 0.3-1 | 4-6 | 60-110 |
| 3,058,805 | 25-200 | 1-3 | 0.5-1.3 | 20-175 |
| 3,058,805 | 35-200 | 0.8-3 | 1.2-2.5 | 20-175 |
| 3,058,805 | ? | ? | 0.5-4.5 | 80 |
| 3,101,251 | 35-200 | 1.3-2.5 | 0.8-3 | 20-120 |
| 3,119,659 | 20-100 | 0.5-1.5 | 1.6-2.4 | 20-175 |
| 4,041,135 | 35-200 | 0.8-3 | 0.5-2.5 | 70-180 |

From the prior art, one would assume that zeolite A could not be made from a reaction mixture having a water to sodium oxide molar ratio of less than 35:1 and a silica to alumina molar ratio greater than 2.4:1. Moreover, none of the above patents teaches a method of forming zeolite A of small and uniform size having a high magnesium carbonate exchange capacity.

The literature also indicates that the apparent pore diameter of zeolite A is between 3.6 and 4.0 angstroms, depending on temperature. At liquid nitrogen temperature ($-195.4$ degrees Celsius), the pore diameter is smallest and prevents nitrogen from being adsorbed into the crystal. For example, as pointed out by Breck, D. W. *Zeolite Molecular Sieves,* New York, John Wiley & Sons, 1974, pages 634-639, at 635; "NaA adsorbs $C_2H_4$ (slowly) and $CH_4$, $\sigma=3.9$ and 3.8A, respectively. At low temperatures, it does not adsorb $N_2$. The apparent pore diameter is 3.6 to 4.0A, depending on temperature. The explanation for this variation has been based upon a process of activated diffusion. It has also been postulated that thermal vibration of the oxygen ions, and cations, in the zeolite lattice surrounding the apertures is responsible."

Further, as pointed out in Milton U.S. Pat. No. 2,882,243, at column 13;

"The activated sodium zeolite A adsorbs water readily and adsorbs in addition somewhat larger molecules. For instance, at liquid air temperatures it adsorbs oxygen but not appreciable amounts of nitrogen as shown below for a typical sodium zeolite A sample.

| Adsorbate | Temperature (°C.) | Partial pressure (mm. Hg) | Weight percent adsorbed on $Na_2A$ |
|---|---|---|---|
| Oxygen | −196 | 100 | 24.8 |

-continued

| Adsorbate | Temperature (°C.) | Partial pressure (mm. Hg) | Weight percent adsorbed on $Na_2A$ |
|---|---|---|---|
| Nitrogen | −196 | 700 | 0.6 |

DISCLOSURE OF THE INVENTION

It is an object of this invention to produce zeolites which have very high exchange capacity for both calcium and magnesium ions, and rapid calcium ion depletion rates which are superior to similar existing zeolites.

Another object of this invention is to produce zeolites of controlled particle size which are useful as ion exchange materials in water softening compositions and detergents; as fillers in paper, rubber, and plastics; and as non-settling flatting pigments In one aspect the present invention provides processes for the production of zeolites of small and uniform size and having high magnesium exchange capacities characterized by the following steps:

(a) forming an aqueous solution of sodium aluminate;
(b) forming an aqueous solution of sodium silicate;
(c) mixing said sodium aluminate and said sodium silicate solutions at a temperature of 40° to 120° C.;
(d) reacting said mixed sodium silicate and sodium aluminate at a temperature slightly higher than said mixing temperature, the reaction mixture having the following molar ratios of components:
 (1) water to sodium oxide 10:1 to 35:1
 (2) sodium oxide to silica 1:1 to 4:1
 (3) silica to alumina 1:1 to 10:1
(e) continuing the reaction at these molar ratios to form the zeolite while controlling the molar ratios and reaction time to produce a fine particle size zeolite having an average particle size of less than 2 microns in diameter; and
(f) recovering the zeolite.

In one embodiment of the invention, zeolites of small and uniform size having a high magnesium exchange capacity are formed when the reaction mixture has a water to sodium oxide molar ratio of between 10:1 and 35:1, preferably between 15:1 and 20:1, most preferably about 20:1; a sodium oxide to silica molar ratio of between 1:1 and 4:1, preferably between 1:1 and 2.5:1, more preferably between 1.5:1 and 2:1, most preferably about 2:1; and a silica to alumina molar ratio of between 1:1 and 10:1, preferably between 1.4:1 and 10:1, more preferably between above 2.0:1 and 4.5:1, more preferably between 3:1 and 8:1, most preferably about 3:1. In a separate embodiment, when the sodium oxide to silica molar ratio is less than 3, the silica to alumina molar ratio is at least 1. When the sodium oxide to silica molar ratio is at least 4:3, the sodium oxide to alumina molar ratio is at least 4:1. Further, when the $SiO_2:Al_2O_3$ molar ratio is 2.0:1 or below, the maximum temperature of reaction is about 80° C. Also, as this ratio decreases, the number of combinations of variables decreases.

The present invention involves the production of zeolites of small and uniform size having characteristics typical of known zeolites but also having a high exchange capacity for both calcium and magnesium ions, and a rapid calcium ion depletion rate which is superior to similar zeolites. These zeolites are produced without the use of mechanical methods such as high shear agitation or grinding of the product. The zeolites of the invention in one embodiment are similar to zeolite A in chemical formula and x-ray diffraction pattern but different from zeolite A in having depressed peak intensities in the x-ray diffraction pattern, in having unexpectedly high magnesium exchange capacity, and in having larger ports or pore size diameters than zeolite A.

In a main embodiment of the present invention, zeolite particles of small and uniform average particle size of no more than 3.5 microns with at least 90% of the weight between 0.1 and 6.0 microns, and having a high magnesium exchange capacity, are produced by forming a sodium aluminate solution, forming a sodium silicate solution, mixing the sodium aluminate solution and the sodium silicate solution to form a reaction mixture comprising either a sodium silicate, sodium aluminate, or sodium hydroxide mother liquor, and an amorphous sodium aluminosilicate which contains the following molar ratios of sodium oxide ($Na_2O$) to silica ($SiO_2$), silica ($SiO_2$) to alumina ($Al_2O_3$), and water ($H_2O$) to sodium oxide ($Na_2O$):

$Na_2O$: $SiO_2 = 1.2:1$ to $10.0:1$
$SiO_2:Al_2O_3 = 1.0:1$ to $7.3:1$
$H_2: Na_2 = 10:1$ to $30:1$;

heating the reaction mixture to a temperature of from 40 to 120 degrees Celsius, more preferably from 60 to 120 degrees Celsius, most preferably 60 degrees Celsius, and reacting until a zeolite is formed, then recovering that zeolite; wherein, in the reaction, said molar ratios and reaction temperatures are chosen from the values provided so as to produce zeolites of average particle size in microns whose natural log (ln) is in accordance with the following equation:

$$\begin{aligned}\text{Average ln} \\ \text{(Particle Size)}\end{aligned} = \begin{aligned}&A(N/S \times S/A) + B(H/N \times \text{Temp}/100) + \\ &C(S/A)^3 + D(S/A)^2 + E(H/N \div S/A) + \\ &F(S/A) + G(\text{Temp}/100)^3 + H(H/N \div N/S) + \\ &I(N/S)^2 + J(N/S \div S/A) + K\end{aligned}$$

wherein:
H/N—Moles of $H_2O \div$ moles $Na_2O$ present in the batch;
N/S—Moles $Na_2O \div$ moles $SiO_2$ present in the batch;
S/A—Moles $SiO_2 \rightarrow$ moles $Al_2O_3$ present in the batch;
Temp - Reaction temperature in degrees Celsius at which the batch is held until crystallization is complete;
and A, B, C, D, E, F, G, H, I, J, and K are constants having the following values:
A = −0.14827
B = 0.11922
C = −0.03245
D = 0.59054
E = −0.10945
F = −3.31907
G = 0.50955
H = 0.00532
I = 0.12626
J = −0.76339
K = 5.40831.

Both the sodium aluminate solution and the sodium silicate solution are preferably preheated to a temperature of between 40 and 120 degrees Celsius prior to mixing and more preferably 80 degrees Celsius. In a preferred procedure, the sodium aluminate solution is rapidly added to the sodium silicate solution so that all of the sodium aluminate solution is added in a period of about 30 seconds to about 30 minutes, depending on the volume. The mother liquor can be recycled as a source of sodium and silica, if suitable. Thus at a batch concentration of $SiO_2/Al_2O_3$ of 2.0, the mother liquor is NaOH and contains no appreciable $SiO_2$ or $Al_2O_3$, and at a batch concentration of $SiO_2/Al_2O_3$ of less than 2.0 the mother liquor contains sodium and aluminum, and at a batch concentration of $SiO_2/Al_2O_3$ of greater than 2.0, the mother liquor contains sodium and silica. The reaction mixture is provided with good agitation to ensure good mixing.

According to further features of the present invention, there are provided zeolite particles of generally small and uniform size which have average particle sizes of less than about 3.5 microns, preferably less than about 2.0 microns, having a magnesium exchange capacity of greater than about 90 mg, preferably about 140 mg $MgCO_3$/g of zeolite, a calcium carbonate exchange capacity of greater than about 230 mg $CaCO_3$/g of zeolite, a port size or pore diameter greater than conventional zeolite A in that the particles have the capacity to absorb nitrogen into the crystal structure, an x-ray diffraction pattern essentially the same as zeolite A except that the peak intensities in the pattern are depressed from that of a 4 micron zeolite standard, and a surface area of greater than 10 $m^2/g$ and preferably in the range of 10 to 176 $m^2/g$, said products being characterized in that said average particle sizes of less than 3.5 microns are produced from a batch reaction mixture comprising sodium silicate, sodium aluminate, or sodium hydroxide mother liquor and an amorphous sodium alumino silicate, in total having a water to sodium oxide molar ratio of between 10:1 and 30:1; a sodium oxide to silicate molar ratio of between 1.2:1 and 10.0:1, and a silica to alumina molar ratio of between 1.0:1 and 7.3:1, wherein said mixture is reacted at a temperature of about 60 degrees Celsius to 120 degrees Celsius; wherein said molar ratios and reaction temperature are chosen from the values provided so as to produce zeolite particles of average particle size in microns of less than 3.5 and preferably less than 2.1 in accordance with the following equation where ln is natural log:

$$\begin{aligned}\text{Average ln} \\ \text{(Particle Size)}\end{aligned} = \begin{aligned}&A(N/S \times S/A) + B (H/N \times \text{Temp}/100) + \\ &C(S/A)^3 + D(S/A)^2 + \\ &E(H/N \div S/A) + F(S/A) + \\ &G(\text{Temp}/100)^3 + H(H/N \div N/S) + \\ &I(N/S)^2 + J(N/S \div S/A) + K\end{aligned}$$

wherein:
H/N—Moles of $H_2O \rightarrow$ moles $Na_2O$ present in the batch;
N/S—Moles $Na_2O \rightarrow$ moles $SiO_2$ present in the batch;
S/A—Moles $SiO_2 \rightarrow$ moles $Al_2O_3$ present in the batch;
Temp—Reaction temperature in degrees Celsius at which the batch is held until crystallization is complete and where A to K are constants as above;
and provided further that said surface areas of greater than about 10 $m^2/g$ are obtained by selecting said molar ratios and reaction temperature from the values provided so that the measured surface area is a function of synthesis conditions and is expressed mathematically by the following equation:

$$\begin{aligned}\text{Surface area,} \\ m^2/g\end{aligned} = \begin{aligned}&A(H_2O/Na_2O) + B(Na_2O/SiO_2) + \\ &C(SiO_2/Al_2O_3)^2 + D(SiO_2/Al_2O_3)^3 + \\ &E(\text{Temp})^2 + F(H_2O/Al_2O_3) + \\ &G(H_2O/Al_2O_3)^2 + H(H_2O/Al_2O_3)^3 + \\ &I(H_2O/Na_2O \times \text{Temp.}) + J(SiO_2/Al_2O_3 \times \\ &\text{Temp.}) + K(H_2O/Na_2O \div Na_2O/SiO_2) +\end{aligned}$$

-continued $$L(H_2O/Na_2O \div SiO_2/Al_2O_3) +$$
$$M(Na_2O/SiO_2 \div SiO_2/Al_2O_3) + N$$

wherein:

| A = | −57.11009845 | H = | $2.6067484 \times 10^{-5}$ |
| B = | −113.11000549 | I = | 0.13123613 |
| C = | −65.39277171 | J = | 1.86829830 |
| D = | 4.76134125 | K = | 33.33057224 |
| E = | −0.04384689 | L = | 14.30545704 |
| F = | 9.69234350 | M = | 93.07457393 |
| G = | −0.02585795 | N = | 233.29360457 | wherein:
$H_2O$ = Total moles of $H_2O$ in the batch
$Na_2O$ = Total moles of $Na_2O$ in the batch
$SiO_2$ = Total moles of $SiO_2$ in the batch
$Al_2O_3$ = Total moles of $Al_2O_3$ in the batch
Temp. = Temperature in degrees Celsius at which the batch is held until crystallization is complete According to this invention, zeolites of small and uniform size having a high magnesium exchange capacity are formed when the reaction mixture has a water to sodium oxide molar ratio of between 10:1 and 30:1, preferably between 15:1 and 20:1, most preferably about 20:1; a sodium oxide to silica molar ratio of between 1.2:1 and 10.0:1, preferably between 1.5:1 and 2.5:1, most preferably about 2.4:1; and a silica to alumina molar ratio of between 1.0:1 and 7.3:1, preferably between 1.4:1 and 4.5:1, most preferably about 2.0:1 for detergent production.

The particle size of the zeolite similar to zeolite A may be controlled by adjusting the silica to alumina molar ratio, with the particle size decreasing as the silica to alumina molar ratio is increased and the particle size increasing as the silica to alumina molar ratio is decreased. The particle size can also be controlled by adjusting either the sodium oxide to alumina molar ratio or the alumina concentration, with the particle size decreasing as the sodium oxide to alumina molar ratio is increased or the alumina concentration is decreased, and the particle size increasing as the sodium oxide to alumina molar ratio is decreased or the alumina concentration is increased.

This zeolite has a calcium carbonate exchange capacity greater than 230 mg calcium carbonate per gram zeolite and a magnesium carbonate exchange capacity greater than 90, and preferably greater than 120 mg magnesium carbonate per gram zeolite. The resulting particles exhibit a narrow differential weight percent gaussian distribution with an average particle size of no more than 2.1 microns with at least 90% of the weight between 0.1 and 4.0 microns, wherein the cumulative percent population exhibits at least 35% less than one micron, with no more than 5% greater than 5 microns.

This zeolite most preferably has a calcium carbonate exchange capacity greater than 250 mg calcium carbonate/g zeolite and a magnesium exchange capacity greater than 140 mg carbonate/g zeolite. It has 90% of the particles less than 2 microns. The resulting zeolite particles preferably exhibit a narrow differential weight percent gaussian distribution with an average particle size of no more than 1.6 microns with at least 90% of the weight between 0.1 and 4.0 microns, wherein the cumulative percent population exhibits at least 64% less than one micron, with no more than 1% greater than 2.0 microns. It is useful as an ion exchange material in water softening compositions and detergents; as a filler in paper, rubber and plastics; and as a non-settling flatting pigment.

The small particle size zeolites of the present invention, are similar to zeolite A of the prior art discussed above. Thus, the chemical formula for the zeolites of the invention is essentially the same as that recognized by the art for zeolite A. This formula is as follows:

$$1.0 \pm 0.2 Na_2O : Al_2O_3 : 1.85 \pm 0.5 SiO_2 : yH_2O$$

where y has a value of up to 6.

In addition, the x-ray diffraction pattern shows peaks in the same regions as zeolite A but the peaks are depressed from those of zeolite A. A substantial distinction is found in the fact that the zeolites of this invention have larger ports or pore diameters and thus increased surface areas when compared with zeolite A. The zeolites disclosed and claimed herein are thus described as modified zeolite A particles.

The concept of increased pore diameter in small particle size modified zeolite A is supported by surface area measurements. Since these measurements are based on nitrogen adsorption at −195 degrees Celsius and nitrogen is theoretically too large to enter the zeolite A cages, only external surface area should be measured. For zeolite A with an average diameter of 1 μm, surface area by this technique should be about 3 m²/g. In general, one finds that the measured surface area increases dramatically when the average particle size is less than two micrometers. Below this size, surface areas in excess of 100 m²/g are not unusual. In order to obtain such hugh surface areas, the pore diameter of the zeolite must have increased. This would permit nitrogen to enter the crystal and begin to reflect internal surface area which is estimated to be in excess of 600 m²/g.

A most surprising and significant improvement found in smaller particle sizes of zeolite was an increased magnesium exchange rate. This was unexpected because large particle size zeolite A as described in U.S. Pat. No. 4,041,135, exchanges only 49 mg $MgCO_3/g$ in 15 minutes but can reach 160 mg $MgCO_3/g$ in 24 hours. The literature frequently cites this as a major inadequacy in detergent formulations. The accepted explanation of low magnesium exchange in zeolite A is related to the pore diameter of the zeolite relative to the larger diameter of the hydrated magnesium ion. Simply stated, the rate and apparent $Mg^{++}$ capacity is limited by the fact that the hydrated magnesium ion has difficulty diffusing through the pores of the zeolite. Since the small particle size zeolite can achieve exchange capacities of 140-160 mg/g in 15 minutes, it appears clear that the pore diameter of the zeolite is increased over that of zeolite A.

In an interesting aspect, the zeolite particles of the invention were found to have bimodal pore size distribution. This may be the reason the zeolites of the invention can absorb gases which are not absorbed by similar types of zeolites.

In a further embodiment, a zeolite similar to zeolite X of small and uniform size having a high magnesium exchange capacity is formed when the reaction mixture has a water to sodium oxide molar ratio of between 30:1 and 60:1, most preferably about 30:1; a sodium oxide to silica molar ratio of between 1:1 and 3:1, preferably between 1.2:1 and 1.7:1, most preferably about 1.6:1; and a silica to alumina molar ratio of between 5:1 and 10:1, preferably between 6:1 and 8:1, most preferably about 7.3:1.

This zeolite has a calcium carbonate exchange capacity greater than 205 mg calcium carbonate per gram zeolite and a magnesium exchange capacity greater than 130 mg magnesium carbonate per gram zeolite, with the resulting zeolite particles exhibiting a narrow differential weight percent gaussian distribution with an average particle size of no more than 2.2 microns with at least 90% of the weight between 0.1 and 5.0 microns, wherein the cumulative percent population exhibits at least 41% less than one micron, with no more than 5% greater than 3.2 microns.

This zeolite preferably has 90% of the particles less than 2 microns. It preferably has a calcium carbonate exchange capacity greater than 230 mg calcium carbonate/g zeolite and a magnesium carbonate exchange capacity greater than 135 mg magnesium carbonate/g zeolite. It is useful as an ion exchange material in water softening compositions and detergents; as a filler in paper, rubber and plastics; and as a non-settling flatting pigment.

In still a further embodiment, a combination of from 20 to 80% of a zeolite similar to zeolite X and from 20 to 80% of a zeolite similar to zeolite A is formed when the reaction mixture has a water to sodium oxide molar ratio of between 10:1 and 60:1, preferably between 20:1 and 50:1, more preferably between 25:1 and 35:1, most preferably about 30:1; a sodium oxide to silica molar ratio of between 0.5:1 and 3:1, preferably between 1.4:1 and 3:1, more preferably between 1.6:1 and 2:1, most preferably about 1.7:1; and a silica to alumina molar ratio of between 2:1 and 15:1, preferably between 2:1 and 10:1, more preferably between 2:1 and 8:1, most preferably about 5.3:1.

This combination of these zeolites similar to zeolite A and zeolite X has a carbonate exchange capacity greater than 220 mg calcium carbonate per gram zeolite and a magnesium exchange capacity greater than 115 mg magnesium exchange capacity greater than 115 mg magnesium carbonate per gram zeolite, with the resulting zeolite particles exhibiting a narrow differential weight percent gaussian distribution with an average particle size of no more than 5.4 microns with at least 90% of the weight between 0.1 and 10.0 microns, wherein the cumulative percent population exhibits at least 37% less than one micron, with no more than 5% greater than 5 microns.

This combination of these zeolites similar to zeolite A and zeolite X preferably has 90% of the particles less than 2 microns. It preferably has a calcium carbonate exchange capacity greater than 230 mg calcium carbonate/g zeolite and a magnesium exchange capacity greater than 135 mg magnesium carbonate/g zeolite. It is useful as an ion exchange material in water softening compositions and detergents; as a filler in paper, rubber and plastics; and as a nonsettling flatting pigment.

In the following discussion the zeolites of this invention which are similar to zeolite A, zeolite X and zeolite Y, are referred to as zeolite A, zeolite X and zeolite Y for convenience. As pointed out above however, the zeolites of this invention are different from zeolite A, zeolite X and zeolite Y of the prior art.

In a still further embodiment of the present invention, zeolite Y is produced by dissolving sand in a sodium hydroxide solution at a pressure of at least 100 psig, preferably 140 psig; heated to a temperature of at least 130° C., activating the sodium silicate thus formed with alumina, forming a sodium aluminate solution, adding sodium aluminate solution to the sodium silicate solution so that all of the sodium aluminate solution is added within 30 seconds to form a reaction mixture comprising a sodium silicate mother liquor and an amorphous sodium alumino silicate pigment having, in total, a certain composition, heating the mixture to a temperature of from 80° to 120° C., reacting the mixture at a temperature of from 80° to 120° C., then recovering the zeolite produced. The sodium silicate solution has a silica to sodium oxide molar ratio of between 2.4:1 and 2.8:1, preferably about 2.4:1. The sodium silicate is activated with from 50 to 2000 ppm alumina at a temperature of from 15° to 100° C. for at least 10 minutes, preferably with from 400 to 600 ppm alumina at room temperature, most preferably with about 500 pp alumina. The sodium silicate solution is heated to a temperature of between 80° and 120° C., preferably 90° C. The sodium aluminate solution is also heated to a temperature of between 80° and 120° C., preferably 90° C. The composition of the reaction mixture has a sodium oxide to silica molar ratio of between 0.5 and 1.0:1, preferably about 0.56:1. It has a silica to alumina molar ratio of between 7:1 and 30:1, preferably between 7:1 and 10:1, and most preferably of about 7.8:1. The reaction mixture also has a water to sodium oxide molar ratio of between 10:1 and 90:1, preferably between 20:1 and 40:1 and most preferably of about 20:1. The reaction mixture is reacted at a temperature of from 80° to 120° C. until crystalline zeolite Y is formed, preferably at a temperature of from 80° to 100° C., most preferably at a temperature of about 100° C. The sodium silicate mother liquor may be recycled as a source of sodium silicate solution.

DESCRIPTION OF THE PREFERRED EMBODIMENTS

In its broadest aspect, the present invention is based upon four different discoveries: (1) the discovery that the type of zeolite formed is determined by how long it takes for the zeolite to be formed at a given reaction temperature; (2) the discovery that the reaction time needed to crystallize a zeolite at a given reaction temperature is a function primarily of the water to sodium oxide molar ratio, with the sodium oxide to silica and silica to alumina molar ratios having a smaller effect on reaction time; (3) the discovery that the magnesium exchange capacity of zeolite A is a function of particle size of the zeolite; and (4) the discovery that the particle size of a zeolite is a function of silica to alumina molar ratio, sodium oxide to alumina molar ratio, and alumina concentration.

The zeolites of small and uniform particle size of this invention are produced using these four discoveries in a reaction mixture having a high silica to alumina molar ratio, with the other oxide molar ratios adjusted to produce the desired zeolite. In the known processes for forming zeolites, a reaction mixture of sodium-aluminum-silicate water is prepared having a particular composition. This mixture is maintained at a certain temperature until crystals are formed, then the crystals are separated from the reaction mixture. For silica to alumina molar ratios greater than two, the reaction mixture consists of a sodium silicate mother liquor and an amorphous sodium alumino silicate pigment. When this two phase reaction mixture is reacted at elevated temperatures, nothing visually happens for a certain period of time, but after that period of time the zeolite rapidly crystallizes and can then be separated from the reaction mixture.

The present invention is based in part upon the discovery that, for any particular source of silica, the type of zeolite formed is determined by the reaction time necessary for the beginning of crystallization to occur at a given reaction temperature. When the reaction time is short, hydroxy-sodalite is formed, but when the reaction time is longer, zeolite A is formed. When the reaction time is still longer, zeolite X is formed. When the reaction time is between that necessary for the formation of zeolite A and that necessary for the formation of zeolite X, then a combination of zeolite A and zeolite X is formed. The reaction time is dependent upon the source of silica and whether or not the silica has been activated. The preferred reaction time can be found readily by experimentation for any particular source of silica.

The reaction time necessary for crystallization at a given reaction temperature can be controlled in a variety of ways, but the major way of controlling reaction time is by adjusting the water to sodium oxide molar ratio of the reaction mixture. The reaction time necessary to form a zeolite is directly proportional to the water to sodium oxide molar ratio used. For instance, when the source of silica is not activated with alumina, the preferred water to sodium oxide molar ratio for making zeolite A is between 15:1 and 20:1; for making zeolite X, it is between 30:1 and 60:1 and for making a combination of zeolite X and zeolite A it is between 25:1 and 35:1. One possible explanation is that a higher water to sodium oxide ratio means the solution is more dilute, which means that it takes longer for the reaction sites to come together, which causes a longer reaction time. Therefore, to get a zeolite A in a reaction mixture having a sodium oxide to silica molar ratio and a silica to alumina molar ratio where normally a zeolite X would be formed, one would decrease the water to sodium oxide ratio. Adjusting the water to sodium oxide molar ratio is the main control for determining which type of zeolite is formed and is analogous to a course control on a proportional feedback controller.

This relationship between the water to sodium oxide molar ratio and the type of zeolite formed was not previously known. For instance, prior art U.S. Pat. Nos. 2,882,243 and 2,882,244, show a water to sodium oxide molar ratio of from 35 to 200 for the production of zeolite A and a water to sodium oxide molar ratio of from 35 to 60 for the production of zeolite X, respectively. If anything, this would imply that the reaction mixture for preparing zeolite A should have a higher water to sodium oxide molar ratio than the reaction mixture for preparing zeolite X, which is not the case. In U.S. Pat. No. 3,119,659, the water to sodium oxide molar ratio for the production of zeolite A is from 20 to 100 while the water to sodium oxide molar ratio for the production of zeolite X is from 30 to 60. None of the above patents show that the water to sodium oxide molar ratio should be higher for making zeolite X than for making zeolite A.

Another way of controlling the reaction time necessary for crystallization at a given reaction temperature is by adjusting the sodium oxide to silica molar ratio of the reaction mixture. The reaction time necessary to form a zeolite is inversely proportional to the sodium oxide to silica molar ratio used. The effect of sodium oxide to silica molar ratio is less pronounced than that of water to sodium oxide molar ratio.

One possible theory as to why increasing the sodium oxide to silica molar ratio would decrease the reaction time necessary to form a zeolite is that increasing the sodium oxide to silica molar ratio, for a given water to sodium oxide molar ratio reduces the viscosity of the reaction mixture.

Adjusting the silica to alumina molar ratio of the reaction mixture also affects the reaction time necessary for crystallization at a given reaction temperature, but this effect is much less than the effect of sodium oxide to silica molar ratio, which in turn is much less than the effect of water to sodium oxide molar ratio. For a given water to sodium oxide molar ratio and a given sodium oxide to silica molar ratio, the reaction time necessary to form a zeolite is directly proportional to the silica to alumina molar ratio.

The reaction time at a given temperature can be reduced by adding the sodium aluminate solution to the sodium silicate solution at a fast rate of addition, preferably so that all of the sodium aluminate solution is added within 30 seconds, and more preferably simultaneously. Thus, the reaction time necessary for crystallization at a given reaction temperature can be increased by increasing the water to sodium oxide ratio; decreasing the sodium oxide to silica molar ratio; increasing the silica to alumina molar ratio and adding the two materials at a slow rate of addition.

Using these criteria, it has been found that the preferred reaction time for forming zeolite A is about ½ to 8 hours, for zeolite X, about ½ to 8 hours, and mixtures of zeolites A and X, about 4 to 8 hours.

The present invention is also based upon the discovery that the magnesium exchange capacity of zeolite A is a function of zeolite particle size. As the particle size decreases, the magnesium exchange capacity increases. For zeolite A, when the average diameter is 2.4 microns, the magnesium capacity is only 62 mg/g, when the average diameter is 1.1 microns, the magnesium capacity is about 124 mg/g, and when the average diameter is 0.8 microns, the magnesium capacity is 159 mg/g.

Much more important than the effect of silica to alumina molar ratio on reaction time is the effect of silica to alumina molar ratio on particle size. The reason for this effect is not known but the particle size of a zeolite increases as the silica to alumina molar ratio of the reaction mixture decreases. The particle size decreases as the silica to alumina molar ratio increases in the reaction mixture. For instance, the silica to alumina molar ratio of zeolite A is 1.85±0.5. Therefore, a zeolite A formed in a reaction mixture having a silica to alumina molar ratio of 10.1 would have a smaller particle size than a zeolite A formed in a reaction mixture having a silica to alumina molar ratio of 2:1. This means that one can control the particle size of a zeolite by adjusting the silica to alumina molar ratio of the reaction mixture. In order to increase particle size one would adjust the silica to alumina molar ratio of the reaction mixture so that it approaches the silica to alumina molar ratio of the desired product. For zeolite A, that ratio is 1.85±0.5. For zeolite X it is 2.5±0.5. In order to decrease particle size one would adjust the silica to alumina molar ratio of the reaction mixture so that it departs from the silica to alumina molar ratio of the desired product.

For zeolite A down to $SiO_2:Al_2O_3$ ratio of 2 or above, and for zeolite X, the silica to alumina molar ratios of the reaction mixtures used in the present invention are higher than the silica to alumina molar ratios of the desired product. Therefore, to increase the particle size of either zeolite X or zeolite A or a combination thereof, one would decrease the silica to alumina molar ratio of the reaction mixture. In order to decrease the particle size, one would increase the silica to alumina molar ratio of the reaction mixture.

Other means of controlling the particle size of the final product include adjusting either the sodium oxide to alumina molar ratio or the alumina concentration of the reaction mixture. The particle size is inversely proportional to the sodium oxide to alumina molar ratio, and directly proportional to the alumina concentration. The effects of the sodium oxide to alumina molar ratio and the effects of alumina concentration on particle size are of similar magnitude as the effect of silica to alumina molar ratio.

Since silica to alumina molar ratio, sodium oxide to alumina molar ratio, and alumina concentration are all interrelated, it is unclear, at present, which is the predominate factor, but any of the three variables or a combination thereof can be used to control particle size.

The sodium oxide to silica molar ratio of the reaction mixture also affects the particle size of the final product, but this effect is much smaller in magnitude than the effect of silica to alumina molar ratio. For a constant silica to alumina molar ratio, the particle size is inversely proportional to the sodium oxide to silica molar ratio. As the sodium oxide to silica molar ratio increases, the particle size decreases. As the sodium oxide to silica molar ratio decreases, the particle size increases. Thus, the effect of sodium oxide to silica molar ratio of the reaction mixture on particle size can be used in combination with the effect of silica to alumina molar ratio of the reaction mixture on particle size as a means of controlling particle size.

The water to sodium oxide molar ratio of the reaction mixture also affects the particle size of the final product, but this effect is smaller in magnitude than the effect of sodium oxide to silica molar ratio. The reaction temperature also affects the particle size.

Although batch composition and reaction temperature are used to control particle size, there are conditions under which agglomeration can occur. Agglomeration will result in a product which does not exhibit the expected particle size or properties. The processes as described in the patent examples are directed to optimum conditions under which there is no agglomeration. If the temperature of the reactants at the time of mixing is too low or the concentration of the sodium oxide or water are severely altered in the solutions being used, one can expect agglomeration. At an extreme a bimodal distribution may appear. These effects can be overcome by such techniques as longer rates of addition, reverse sequence of addition, higher agitation speeds, etc. The point is that these techniques are not really controlling the primary particle size, they are merely changing the degree of agglomeration. Only batch composition and reaction temperature control primary particle size, and the type of the product formed.

In the present invention, the zeolites of small and uniform size having high magnesium exchange capacities are produced by forming a sodium aluminate solution, forming a sodium silicate solution, and mixing the sodium aluminate solution and the sodium silicate solution to produce a reaction mixture. For $SiO_2:Al_2O_3$ molar ratios greater than 2, this mixture comprises a sodium silicate mother liquor and an amorphous sodium alumino silicate pigment. For such ratios of 2 or below, the mixture contains a sodium aluminate mother liquor. The reaction mixture is heated and reacted at a temperature of from 40° to 120° C., preferably 60° to 100° C. until the desired zeolite is formed, and recovering the desired zeolite from the mother liquor. In the preferred procedure, the sodium silicate and sodium silicate solution are preheated to a temperature of 50° to 120° C., preferably 60° to 100° C., prior to mixing. After mixing an exothermic reaction occupy which raises the temperature about 10° C. at which temperature the reaction takes place. The zeolite is then recovered from the reaction mixture by conventional solids separation techniques such as filtration. The mother liquor or filtrate may be recycled to provide dissolved values of sodium and silica or sodium and alumina.

In one aspect, the sodium silicate solution used in this process can be formed by dissolving sand in a sodium hydroxide solution at a pressure of at least 100 psig and a temperature of at least 130° C. to produce a sodium silicate solution having a silica to sodium oxide molar ratio of between 2.4:1 and 2.8:1. The word "sand" is to be given its usual meaning of "a loose material consisting of small but easily distinguishable grains, usually less than two millimeters in diameter, most commonly of quartz resulting from the disintegration of rocks, and commonly used for making mortar and glass, as an abrasive, or for molds in founding." A temperature of at least 130° C. is used to dissolve the sand because it is more difficult to dissolve sand at lower temperatures.

This sodium silicate solution is activated with from 50 to 2000 ppm alumina preferably, and heated to a temperature between 40° and 120° C. for at least 10 minutes, preferably with 400 to 600 ppm alumina at room temperature. Alumina concentrations of less than 50 ppm alumina do not activate the silica. Alumina concentrations of more than 2000 ppm cause the alumina to precipitate out of the solution as an amorphous sodium alumino silicate. Preferably the silica to sodium oxide molar ratio of the sodium silicate solution is about 2.4:1 to 2.8:1, since this sodium silicate solution is usually less expensive to make than solutions having higher silica to sodium oxide molar ratios, such as waterglass. Activation of the sodium silicate solution is necessary in the production of zeolite Y but optional in production of zeolites A and X, and mixtures of A and X.

After a sodium silicate solution is formed, and is either activated or not activated, a sodium aluminate solution is mixed with the sodium silicate solution as by addition to form a reaction mixture.

When the sodium silicate source has been activated with alumina, the preferred reaction mixture for zeolite A formation has a water to sodium oxide molar ratio of between 25:1 and 35:1; a sodium oxide to silica molar ratio of between 1.4:1 and 2:1; and a silica to alumina molar ratio of between 3:1 and 7:1. When the sodium silicate source has not been activated with alumina, the preferred reaction mixture has a water to sodium oxide molar ratio of between 15:1 and 20:1; a sodium oxide to silica molar ratio of between 1.5:1 and 2:1; and a silica to alumina molar ratio of between 2:1 and 4:1.

When the sodium silicate source has been activated with alumina, the preferred reaction mixture for zeolite X formation has a water to sodium oxide molar ratio of between 30:1 and 40:1; a sodium oxide to silica molar ratio of between 1:1 and 1.2:1 and a silica to alumina molar ratio of between 5:1 and 7:1. When the sodium silicate source has not been activated with alumina, the preferred reaction mixture has a water to sodium oxide molar ratio of between 30:1 and 60:1; a sodium oxide to silica molar ratio of between 1.2:1 and 1.7:1 and a silica to alumina molar ratio of between 6:1 and 8:1.

When the sodium silicate source has been activated with alumina, the preferred reaction mixture for forming a mixture of zeolites A and X has a water to sodium oxide mola ratio of between 15:1 and 60:1; a sodium oxide to silica molar ratio of between 0.7:1 and 1.7:1; and a silica to alumina molar ratio of between 5:1 and 10:1. When the sodium silicate source has not been activated with alumina, the preferred reaction has a water to sodium oxide molar ratio of between 20:1 and 50:1; a sodium oxide to silica molar ratio of between 1.4:1 and 3:1; and a silica to alumina molar ratio of between 2:1 and 10:1.

As the water to sodium oxide molar ratio falls below 10:1, for the sodium oxide to silica and silica to alumina molar ratios of the present invention, there is an increased probability of forming zeolite A instead of a combination of zeolite A and zeolite X. As the water to sodium oxide molar ratio approaches 60:1, for the sodium oxide to silica and silica to alumina molar ratios of the present invention, there is an increased probability of forming zeolite X instead of a combination of zeolite A and zeolite X.

Zeolite Y can be formed from a sodium silicate source activated with alumina when the reaction mixture has a sodium oxide to silica molar ratio of between 0.5:1 and 1:1; and a silica to alumina molar ratio of between 7:1 and 30:1. The preferred reaction mixture has a sodium oxide to silica molar ratio of between 0.5:1 and 1:1; and a silica to alumina molar ratio of between 7:1 and 10:1.

The broad oxide mole ratio ranges for making each zeolite are shown in Table I.

TABLE I

| | BROAD RANGES FOR MAKING ZEOLITES | | |
|---|---|---|---|
| Zeolite | Water/Sodium Oxide | Sodium Oxide/Silica | Silica/Alumina |
| A | 10–35 | 1–4 | 1–10 |
| X | 25–90 | 1–3 | 5–10 |
| X & A | 10–60 | 0.5–3 | 2–15 |
| Y | 10–90 | 0.5–1 | 7–30 |

The preferred oxide mole ratio ranges for making each zeolite using a source of sodium silicate that has not been activated with alumina are shown in Table II.

TABLE II

| | PREFERRED RANGES FOR MAKING ZEOLITES (Unactivated) | | |
|---|---|---|---|
| Zeolite | Water/Sodium Oxide | Sodium Oxide/Silica | Silica/Alumina |
| A | 15–20 | 1.4–2 | 2–4 |
| X | 30–60 | 1.2–1.7 | 6–8 |
| X & A | 20–50 | 1.6–3 | 2–10 |

The preferred oxide mole ratio ranges for making each zeolite using a source of sodium silicate that has been activated with alumina are shown in Table III.

TABLE III

| | PREFERRED RANGES FOR MAKING ZEOLITES (Activated) | | |
|---|---|---|---|
| Zeolite | Water/Sodium Oxide | Sodium Oxide/Silica | Silica/Alumina |
| A | 25–35 | 1.4–2 | 3–7 |
| X | 30–40 | 1–1.2 | 5–7 |
| X & A | 15–60 | 0.7–1.7 | 5–10 |

TABLE III-continued

| | PREFERRED RANGES FOR MAKING ZEOLITES (Activated) | | |
|---|---|---|---|
| Zeolite | Water/Sodium Oxide | Sodium Oxide/Silica | Silica/Alumina |
| Y | 20–40 | 0.5–1 | 7–10 |

To ensure a good yield of the desired zeolite product, it is necessary to react the zeolite mixture beyond a certain minimum time. If, however, the reaction is continued too long, the product starts to lose silica, that is the silica to alumina ratio starts to fall, and if the reaction is continued even further, then the product may recrystallize to an undesirable zeolitic material. There is an optimum reaction time which is, in part, determined by the ratios and concentrations of the original reaction mixture, by the size of the batch, the time required to mix the ingredients and the rate of heating. The optimum reaction time for particular molar ratios can readily be determined by experiment. However, in general reaction times for zeolite A production range from 0.5 to 8 hours, and for zeolite X from 2 to 8 hours.

Once the zeolite has been separated from the mother liquor, the mother liquor may be recycled. Recycling of the mother liquor eliminates the problem of how to dispose of the mother liquor. Although it is possible to use the process of the present invention without recycling the mother liquor, failure to recycle the mother liquor could make the process cost prohibitive.

The silica to alumina molar ratio of zeolite X is about 2.5:1 and the silica to alumina molar ratio of zeolite A is about 1.85:1. As stated above, the particle size of the zeolite is smaller when the silica to alumina molar ratio of the reaction mixture is higher than the silica to alumina molar ratio of the desired zeolite, at silica to alumina molar ratios of greater than 2. Because of this, the zeolite X and the zeolite A of the present invention have smaller particle sizes than those of the prior art.

Because of their small particle size, the zeolite X, the zeolite A and mixtures of the present invention are both useful in a variety of uses such as an ion-exchange material in water softening compositions and detergents; as a filler in paper, rubber and plastics; and as a non-settling flatting pigment. Zeolite Y is useful as an adsorbent.

The zeolite A, having a smaller particle size, has a higher magnesium ion exchange capacity than prior art zeolite A having larger particle sizes. This increased magnesium ion exchange capacity makes this zeolite A expecially useful as an ion exchange material in water softening compositions and detergents.

Another factor that makes the zeolites especially useful as ion exchange materials is their fast calcium carbonate depletion rate. These zeolites remove calcium ions faster than zeolites having larger particle sizes. The zeolite A having the smaller particle size exchanges the calcium ions at a faster rate than the zeolite A having the larger particle size.

As can be seen in Tables I, II and III, the ranges of water to sodium oxide molar ratios needed to produce zeolite X, zeolite A, a combination of zeolite X and zeolite A or zeolite Y overlap each other. The water to sodium oxide molar ratio is the major controlling factor which determines the reaction time necessary for crystallization at a given reaction temperature, which in turn determines the type of zeolite formed. But, as stated above, there are other factors that have a smaller effect on reaction time, such as sodium oxide to silica molar ratio, silica to alumina molar ratio, degree of agitation and rate of addition of the sodium aluminate solution to the sodium silicate solution. These additional factors can either add to or subtract from the effect of water to sodium oxide molar ratio.

For instance, either zeolite X or zeolite A can be formed from a reaction mixture having a water to sodium oxide molar ratio of 30:1. In that case, the additional factors would determine which type of zeolite would be produced. If the sodium oxide to silica molar ratio is 1.2:1 and the silica to alumina molar ratio is 8:1, then zeolite X will be produced. But if the sodium oxide to silica molar ratio is 2:1 and the silica to alumina molar ratio is 3:1, then zeolite A will be produced. The type of zeolite formed depends on the total effect of the water to sodium oxide molar ratio and all of the additional factors mentioned above.

One of the results of using the principles of the present invention is the ability to make a controlled combination of zeolite X and zeolite A in the same reaction. A combination of from 20 to 80% zeolite X and from 20 to 80% zeolite A can be formed by adjusting the reaction time necessary for crystallization to a time beteen that required to make zeolite X and that required to make zeolite A. The composition of the combination depends on the reaction time. If the reaction time is close to that required to make zeolite X, much more zeolite X will be formed than zeolite A. If, on the other hand, the reaction time is close to that of zeolite A, much more zeolite A will be formed than zeolite X. By adjusting the reaction time, one can make any desired combination of zeolite X and zeolite A.

The combination of zeolite X and zeolite A has an average particle size less than 2 microns in diameter. It is useful, because of its small particle size, as an ion exchange material in water softening compositions and detergents, as a filler in paper, rubber and plastics, and as a non-settling flatting pigment.

Any source of sodium silicate can be used in the present invention, but one particularly desirable source of sodium silicate is sand dissolved in caustic. The advantage of this source is its low cost. The sand is dissolved in a sodium hydroxide solution at a pressure of at least 100 psig and a temperature of at least 130° C. to produce a sodium silicate solution having a silica to sodium oxide molar ratio of between 2.4:1 and 2.8:1. Preferably the pressure is about 140 psig, producing a sodium silicate solution having a silica to sodium oxide molar ratio of about 2.4:1. Activation of the silica is always used in production of zeolite Y.

The time required to produce a given product from batches of identical chemical composition will be dependent on the source of silicon dioxide. Each different type of silica source has its own time table specifying the reaction times needed to form each type of zeolite. One of the discoveries upon which this invention is based is the fact that this time table can be changed by activating the silica source with alumina, as described above. The alumina concentration limits of 50 to 2000 ppm alumina are critical values since alumina concentrations below 50 ppm fail to activate the sodium silicate solution.

The alumina used to activate the sodium silicate solution may suitably be provided by a soluble aluminum compound such as sodium aluminate or a water soluble aluminum salt, such as aluminum sulphate. Sodium aluminate is, however, the preferred reagent since it limits the tendency to introduce foreign ions into the zeolite lattice.

There is an important difference between the effect of activation and the effect of reaction time controlling factors such as water to sodium oxide molar ratio, sodium oxide to silica molar ratio, silica to alumina molar ratio and rate of addition. The reaction time controlling factors are used to adjust the reaction time necessary for crystallization so that it will match with the reaction time in a time table produce a particular zeolite. Activation changes the time table. For that reason, the preferred oxide mole ratios for producing a desired zeolite are different when a source of silica is either activated or not activated (see Tables II and III above).

In accordance with a main embodiment of the present invention, it has been found that zeolite products of small and uniform size and with a narrow differential weight percent distribution, are formed by proper selection of the molar ratios and temperatures under which the zeolites are produced. The selection of molar ratios and temperature are from the ranges of molar ratios and temperatures for conducting the reaction set forth above. It has been found that if selections of the molar ratios in the reacting batch together with the temperature range, are in accordance with the following equation that small particle size zeolites of uniform and predictable size and properties or characteristics will result. This equation is as follows where ln is natural log:

$$\text{Average ln (Particle Size)} = A(N/S \times S/A) + B(H/N \times \text{Temp}/100) + C(S/A)^3 + D(S/A)^2 + E(H/N \div S/A) + F(S/A) + G(\text{Temp}/100)^3 + H(H/N \div N/S) + I(N/S)^2 + J(N/S \div S/A) + K$$

wherein average particle size is expressed in microns.

H/N—Moles of $H_2O \div$ moles $Na_2O$ present in the batch;

N/S—Moles $Na_2O \div$ moles $SiO_2$ present in the batch;

S/A—Moles $SiO_2 \div$ moles $Al_2O_3$ present in the batch;

Temp—Reaction temperature in degrees Celsius at which the batch is held until crystallization is complete;

and A, B, C, D, E, F, G, H, I, J and K are constants having the following values:

$$A = -0.14827$$
$$B = 0.11922$$
$$C = -0.03245$$
$$D = 0.59054$$
$$E = -0.10945$$
$$F = -3.31907$$
$$G = -0.50955$$
$$H = 0.00532$$
$$I = 0.12626$$
$$J = -0.76339$$
$$K = 5.40831$$

Selection of the batch molar ratios and temperature in accordance with the above equation enables one to produce zeolites of the desired average particle size. Further, if the molar ratios and temperature are selected from the ranges described in this invention, the resulting average particle size will be within the limits set forth herein. Thus, use of this equation or formula enables one to produce zeolite products wherein 90% of the particles are less than two microns in diameter and wherein the average particle size is no more than about 1.6 microns.

It will be understood that the equation set forth herein enables one to accurately predict the average particle size produced as a result of the reaction. To predict the particle size, the appropriate molar ratio and temperature are selected from within the ranges provided herein and the values are inserted into the equation. The resulting particle size of the zeolite is then predictable from the values employed for the various molar ratios and temperature.

This is an unexpected advance in the art in the production of zeolites in that the prior art heretofore has not been able to consistently produce zeolite particles of small and uniform size and of this uniformity of particle size. The prior art indicates that a small portion of small particle size zeolites is produced together with a predominance of larger particle size zeolites but there is no prior art of which applicant is aware which enables one to produce uniform small particle size modified zeolites.

Because of the small particle size, the zeolites of the present invention are useful in a variety of area such as ion-exchange materials in water softening compositions and detergents; as fillers in paper, rubber and plastics; and as non-settling flatting pigments. This zeolite, having a smaller particle size, has a higher magnesium ion exchange capacity than zeolite A having larger particle sizes. This increased magnesium ion exchange capacity makes the zeolite especially useful as an ion exchange material in water softening compositions and detergents. Another factor that makes the zeolite especially useful as an ion exchange material is its fast calcium carbonate depletion rate. These zeolites remove calcium ions faster than zeolites having larger particle sizes.

The zeolites of the present invention are also advantageous over conventional zeolites such as zeolite A because of their increased port size, i.e. increased pore diameter over conventional zeolite A. As pointed out above, the concept of increased pore diameter in the small particle size zeolites of the present invention is supported by surface area measurements. These surface area measurements are set forth hereinafter. In general, however, these surface area measurements indicate that the surface areas of the modified zeolites of the present invention are greater than about 10 m$^2$/g and preferably in the range of about 10 m$^2$/g to 170 m$^2$/g.

EXAMPLES

The invention will be further illustrated by the following examples which set forth particularly advantageous method and composition embodiments. While the examples illustrate the present invention, they are not intended to limit it. In the examples and throughout the disclosure, parts are by weight unless otherwise indicated.

The following examples were carried out as described herein by forming the silicate and aluminate solutions, preheating each solution to the indicated temperature, and adding the aluminate solution to the silicate solution in the time specified. The resulting gel was broken down by agitation until a homogeneous slurry was obtained and the batch was then reacted at the indicated temperature for the reaction period. The resulting product was characterized by its calcium ion exchange capacity based on mg calcium carbonate/g zeolite, and magnesium ion exchange capacity based on mg magnesium carbonate/g zeolite. The resulting zeolite particles are characterized by differential weight percent gaussian distribution with an average particle size in microns and an indication of the weight between 0.1 and 2.5 microns. The cumulative percent population is also described. These criteria are set forth in the following tables.

In the examples, calcium carbonate exchange capacity was determined by placing the zeolite in an exchange solution, agitating for fifteen minutes, filtering off the zeolite and titrating the filtrate with EDTA (ethylenediaminetetraacetic acid) solution to determine how much calcium ions had been removed. The exchange solution was made from calcium chloride to obtain a concentration equivalent to 122 g calcium carbonate per liter. The filtrate was buffered to pH 10, then Erichrome Black T indicator (3-hydroxy-4-((1-hydroxy-2-naphthyl)azo)-7-nitrol-naphthalenesulfonic acid sodium salt) was added to the filtrate prior to EDTA titration.

Magnesium carbonate exchange capacity was determined by placing the zeolite in an exchange solution, agitating for fifteen minutes, filtering off the zeolite and titrating the filtrate with EDTA solution to determine how much magnesium ions have been removed. The exchange solution was made from magnesium chloride to obtain a concentration equivalent to 1000 ppm magnesium carbonate. The filtrate was buffered to pH 10, then Erichrome Black T indicator was added to the filtrate prior to EDTA filtration.

Particle size measurements were made by Coulter Counter (Model TAII). Particle size analysis by Coulter Counter measures both sample volume and number of particles in specific size ranges. Since volume % and weight % are synonymous when all particles have the same density, weight % is used since it is the most conventional way to express particle size data.

The following terms have been used in describing the particle size of the present invention:

Gaussian distribution: The frequency curves of a gaussian distribution, also known as symmetrical or bell-shaped frequency curves, are characterized by the fact that observations equidistant from the central maximum have the same frequency.

Average particle size: The average particle size is the size at which 50% of the total weight is accounted for. Results were confirmed by Scanning Electron Microscope.

Cumulative % population: The cumulative % population is the percentage of all the counted particles.

The following are examples for preparation of zeolites similar to zeolite A and characterization of the products. In these examples, the exchange rates refer to the zeolite on an anhydrous basis.

TABLE IV

COMPOSITION OF REACTION MIXTURE FOR THE PREPARATION OF ZEOLITE A

| Example | Water/ Sodium Oxide | Sodium Oxide/ Silica | Silica/ Alumina | % Water | % Sodium Oxide | % Silica | % Alumina |
|---|---|---|---|---|---|---|---|
| 1 | 30 | 3.0 | 2.5 | 95.34 | 3.18 | 1.06 | 0.42 |
| 2 | 25 | 2.4 | 3.0 | 94.14 | 3.77 | 1.57 | 0.52 |
| 3 | 25 | 2.4 | 3.0 | 94.14 | 3.77 | 1.57 | 0.52 |
| 4 | 25 | 2.4 | 2.5 | 94.04 | 3.76 | 1.57 | 0.63 |
| 5 | 25 | 2.4 | 2.0 | 93.90 | 3.76 | 1.57 | 0.78 |
| 6 | 25 | 2.4 | 2.0 | 93.90 | 3.76 | 1.57 | 0.78 |
| 7 | 25 | 2.0 | 2.5 | 93.63 | 3.75 | 1.87 | 0.75 |
| 8 | 25 | 2.0 | 2.0 | 93.46 | 3.74 | 1.87 | 0.93 |
| 9 | 25 | 2.0 | 2.0 | 93.46 | 3.74 | 1.87 | 0.93 |
| 10 | 20 | 3.0 | 2.5 | 93.17 | 4.66 | 1.55 | 0.62 |

TABLE IV-continued
COMPOSITION OF REACTION MIXTURE FOR THE PREPARATION OF ZEOLITE A

| Example | Water/Sodium Oxide | Sodium Oxide/Silica | Silica/Alumina | % Water | % Sodium Oxide | % Silica | % Alumina |
|---|---|---|---|---|---|---|---|
| 11 | 20 | 3.0 | 2.5 | 93.17 | 4.66 | 1.55 | 0.62 |
| 12 | 20 | 3.0 | 2.5 | 93.17 | 4.66 | 1.55 | 0.62 |
| 13 | 20 | 2.8 | 2.5 | 93.02 | 4.65 | 1.66 | 0.66 |
| 14 | 20 | 2.8 | 2.5 | 93.02 | 4.65 | 1.66 | 0.66 |
| 15 | 20 | 2.8 | 2.5 | 93.02 | 4.65 | 1.66 | 0.66 |
| 16 | 20 | 2.6 | 2.5 | 92.86 | 4.64 | 1.79 | 0.71 |
| 17 | 20 | 2.6 | 2.5 | 92.86 | 4.64 | 1.79 | 0.71 |
| 18 | 20 | 2.6 | 2.5 | 92.86 | 4.64 | 1.79 | 0.71 |
| 19 | 20 | 2.2 | 5.3 | 92.85 | 4.64 | 2.11 | 0.40 |
| 20 | 25 | 1.6 | 2.0 | 92.81 | 3.71 | 2.32 | 1.16 |
| 21 | 20 | 2.4 | 3.0 | 92.78 | 4.64 | 1.93 | 0.65 |
| 22 | 20 | 2.4 | 3.0 | 92.78 | 4.64 | 1.93 | 0.65 |
| 23 | 20 | 2.2 | 4.3 | 92.76 | 4.64 | 2.11 | 0.49 |
| 24 | 20 | 2.0 | 7.3 | 92.73 | 4.64 | 2.32 | 0.32 |
| 25 | 20 | 2.0 | 7.3 | 92.73 | 4.64 | 2.32 | 0.32 |
| 26 | 20 | 2.0 | 6.3 | 92.68 | 4.63 | 2.32 | 0.37 |
| 27 | 20 | 2.4 | 2.5 | 92.66 | 4.63 | 1.93 | 0.77 |
| 28 | 20 | 2.4 | 2.5 | 92.66 | 4.63 | 1.93 | 0.77 |
| 29 | 20 | 2.4 | 2.5 | 92.66 | 4.63 | 1.93 | 0.77 |
| 30 | 20 | 2.4 | 2.5 | 92.66 | 4.63 | 1.93 | 0.77 |
| 31 | 20 | 2.0 | 5.3 | 92.62 | 4.63 | 2.32 | 0.44 |
| 32 | 20 | 1.9 | 7.3 | 92.60 | 4.63 | 2.44 | 0.33 |
| 33 | 20 | 2.0 | 4.3 | 92.52 | 4.63 | 2.31 | 0.54 |
| 34 | 20 | 2.4 | 2.0 | 92.49 | 4.62 | 1.93 | 0.96 |
| 35 | 20 | 2.4 | 2.0 | 92.49 | 4.62 | 1.93 | 0.96 |
| 36 | 20 | 1.8 | 7.3 | 92.46 | 4.62 | 2.57 | 0.35 |
| 37 | 20 | 2.2 | 2.5 | 92.44 | 4.62 | 2.10 | 0.84 |
| 38 | 20 | 2.2 | 2.5 | 92.44 | 4.62 | 2.10 | 0.84 |
| 39 | 20 | 2.2 | 2.5 | 92.44 | 4.62 | 2.10 | 0.84 |
| 40 | 20 | 1.8 | 6.3 | 92.41 | 4.62 | 2.57 | 0.41 |
| 41 | 20 | 2.0 | 3.3 | 92.37 | 4.62 | 2.31 | 0.70 |
| 42 | 20 | 2.0 | 3.3 | 92.37 | 4.62 | 2.31 | 0.70 |
| 43 | 20 | 1.7 | 7.3 | 92.30 | 4.62 | 2.72 | 0.37 |
| 44 | 20 | 1.8 | 4.3 | 92.23 | 4.61 | 2.56 | 0.60 |
| 45 | 20 | 2.0 | 2.5 | 92.17 | 4.61 | 2.30 | 0.92 |
| 46 | 20 | 2.0 | 2.5 | 92.17 | 4.61 | 2.30 | 0.92 |
| 47 | 20 | 2.0 | 2.5 | 92.17 | 4.61 | 2.30 | 0.92 |
| 48 | 20 | 2.0 | 2.5 | 92.17 | 4.61 | 2.30 | 0.92 |
| 49 | 20 | 1.6 | 7.3 | 92.12 | 4.61 | 2.88 | 0.39 |
| 50 | 20 | 1.6 | 7.3 | 92.12 | 4.61 | 2.88 | 0.39 |
| 51 | 20 | 1.6 | 7.3 | 92.12 | 4.61 | 2.88 | 0.39 |
| 52 | 20 | 1.6 | 7.3 | 92.12 | 4.61 | 2.88 | 0.39 |
| 53 | 20 | 1.6 | 7.3 | 92.12 | 4.61 | 2.88 | 0.39 |
| 54 | 20 | 1.8 | 3.3 | 92.06 | 4.60 | 2.56 | 0.77 |
| 55 | 20 | 1.6 | 5.3 | 91.98 | 4.60 | 2.87 | 0.54 |
| 56 | 20 | 2.0 | 2.0 | 91.95 | 4.60 | 2.30 | 1.15 |
| 57 | 20 | 2.0 | 2.0 | 91.95 | 4.60 | 2.30 | 1.15 |
| 58 | 20 | 1.5 | 7.3 | 91.92 | 4.60 | 3.06 | 0.42 |
| 59 | 20 | 1.5 | 7.3 | 91.92 | 4.60 | 3.06 | 0.42 |
| 60 | 20 | 1.5 | 6.3 | 91.86 | 4.59 | 3.06 | 0.49 |
| 61 | 20 | 1.5 | 6.3 | 91.86 | 4.59 | 3.06 | 0.49 |
| 62 | 20 | 1.8 | 2.5 | 91.84 | 4.59 | 2.55 | 1.02 |
| 63 | 20 | 1.8 | 2.5 | 91.84 | 4.59 | 2.55 | 1.02 |
| 64 | 20 | 1.8 | 2.5 | 91.84 | 4.59 | 2.55 | 1.02 |
| 65 | 20 | 1.5 | 5.3 | 91.77 | 4.59 | 3.06 | 0.58 |
| 66 | 20 | 1.4 | 7.3 | 91.69 | 4.59 | 3.28 | 0.45 |
| 67 | 20 | 1.6 | 3.3 | 91.68 | 4.58 | 2.87 | 0.87 |
| 68 | 20 | 1.6 | 3.3 | 91.68 | 4.58 | 2.87 | 0.87 |
| 69 | 20 | 1.6 | 3.3 | 91.68 | 4.58 | 2.87 | 0.87 |
| 70 | 20 | 1.6 | 3.3 | 91.68 | 4.58 | 2.87 | 0.87 |
| 71 | 20 | 1.6 | 3.3 | 91.68 | 4.58 | 2.87 | 0.87 |
| 72 | 20 | 1.4 | 6.3 | 91.63 | 4.58 | 3.27 | 0.52 |
| 73 | 20 | 1.6 | 3.0 | 91.60 | 4.58 | 2.86 | 0.96 |
| 74 | 20 | 1.4 | 5.3 | 91.54 | 4.58 | 3.27 | 0.62 |
| 75 | 20 | 1.6 | 2.5 | 91.43 | 4.57 | 2.86 | 1.14 |
| 76 | 20 | 1.6 | 2.5 | 91.43 | 4.57 | 2.86 | 1.14 |
| 77 | 20 | 1.4 | 3.3 | 91.20 | 4.56 | 3.26 | 0.99 |
| 78 | 20 | 1.6 | 2.0 | 91.17 | 4.56 | 2.85 | 1.42 |
| 79 | 20 | 1.6 | 2.0 | 91.17 | 4.56 | 2.85 | 1.42 |
| 80 | 20 | 1.2 | 7.3 | 91.13 | 5.56 | 3.80 | 0.52 |
| 81 | 20 | 1.2 | 6.3 | 91.05 | 4.55 | 3.79 | 0.60 |
| 82 | 20 | 1.4 | 2.5 | 90.91 | 4.55 | 3.25 | 1.30 |
| 83 | 20 | 1.4 | 2.5 | 90.91 | 4.55 | 3.25 | 1.30 |
| 84 | 20 | 1.2 | 4.3 | 90.80 | 4.54 | 3.78 | 0.88 |
| 85 | 20 | 1.2 | 3.3 | 90.56 | 4.53 | 3.77 | 1.14 |
| 86 | 15 | 2.4 | 2.5 | 90.45 | 6.03 | 2.51 | 1.01 |
| 87 | 15 | 2.4 | 2.0 | 90.23 | 6.02 | 2.51 | 1.25 |
| 88 | 20 | 1.2 | 2.5 | 90.23 | 4.51 | 3.76 | 1.50 |
| 89 | 15 | 2.0 | 2.0 | 89.55 | 5.97 | 2.99 | 1.49 |
| 90 | 15 | 1.6 | 2.5 | 88.89 | 5.93 | 3.70 | 1.48 |
| 91 | 15 | 1.6 | 2.0 | 88.56 | 5.90 | 3.69 | 1.85 |
| 92 | 15 | 1.6 | 2.0 | 88.56 | 5.90 | 3.69 | 1.85 |

TABLE V
ZEOLITE A - REACTION CONDITIONS

| Example | Temps. °C. Silicate | Temps. °C. Aluminate | Time of Addition (sec.) | Reaction Temp. °C. | Reaction Time (Hrs.) |
|---|---|---|---|---|---|
| 1 | 90 | 90 | 30 | 100 | 4.0 |
| 2 | 50 | 50 | 30 | 60 | 8.0 |
| 3 | 70 | 70 | 30 | 80 | 2.0 |
| 4 | 50 | 50 | 30 | 60 | 7.5 |
| 5 | 50 | 50 | 30 | 60 | 6.0 |
| 6 | 70 | 70 | 30 | 80 | 2.5 |
| 7 | 50 | 50 | 30 | 60 | 6.5 |
| 8 | 50 | 50 | 30 | 60 | 6.5 |
| 9 | 70 | 70 | 30 | 80 | 2.5 |
| 10 | 50 | 50 | 30 | 60 | 4.0 |
| 11 | 70 | 70 | 30 | 80 | 1.5 |
| 12 | 90 | 90 | 30 | 100 | 0.5 |
| 13 | 50 | 50 | 30 | 60 | 4.0 |
| 14 | 70 | 70 | 30 | 80 | 2.0 |
| 15 | 90 | 90 | 30 | 100 | 0.5 |
| 16 | 50 | 50 | 30 | 60 | 3.0 |
| 17 | 70 | 70 | 30 | 80 | 2.0 |
| 18 | 90 | 90 | 30 | 100 | 0.5 |
| 19 | 90 | 90 | 30 | 100 | 0.5 |
| 20 | 50 | 50 | 30 | 60 | 8.0 |
| 21 | 50 | 50 | 30 | 60 | 3.5 |
| 22 | 70 | 70 | 30 | 80 | 2.0 |
| 23 | 90 | 90 | 30 | 100 | 1.0 |
| 24 | 90 | 90 | 30 | 100 | 2.0 |
| 25 | 90 | 90 | 30 | 100 | 1.0 |
| 26 | 90 | 90 | 30 | 100 | 1.0 |
| 27 | 50 | 50 | 30 | 60 | 4.0 |
| 28 | 70 | 70 | 30 | 80 | 1.5 |
| 29 | 90 | 90 | 30 | 100 | 2.5 |
| 30 | 90 | 90 | 30 | 100 | 0.5 |
| 31 | 90 | 90 | 30 | 100 | 1.0 |
| 32 | 90 | 90 | 30 | 100 | 1.0 |
| 33 | 90 | 90 | 30 | 100 | 1.0 |
| 34 | 50 | 50 | 30 | 60 | 3.5 |
| 35 | 70 | 70 | 30 | 80 | 1.0 |
| 36 | 90 | 90 | 30 | 100 | 1.0 |
| 37 | 70 | 70 | 30 | 80 | 1.5 |
| 38 | 50 | 50 | 30 | 60 | 4.0 |
| 39 | 90 | 90 | 30 | 100 | 0.5 |
| 40 | 90 | 90 | 30 | 100 | 2.0 |
| 41 | 90 | 90 | 30 | 100 | 2.0 |
| 42 | 90 | 90 | 600 | 100 | 2.0 |
| 43 | 90 | 90 | 30 | 100 | 1.0 |
| 44 | 90 | 90 | 30 | 100 | 2.0 |
| 45 | 50 | 50 | 30 | 60 | 4.0 |
| 46 | 70 | 70 | 30 | 80 | 3.0 |
| 47 | 50 | 50 | 30 | 60 | 3.5 |
| 48 | 90 | 90 | 30 | 100 | 0.5 |
| 49 | 90 | 90 | 30 | 100 | 2.0 |
| 50 | 90 | 90 | 300 | 100 | 1.5 |
| 51 | 90 | 90 | 600 | 100 | 2.0 |
| 52 | 90 | 90 | 1200 | 100 | 2.0 |
| 53 | 90 | 90 | 30 | 100 | 2.0 |
| 54 | 90 | 90 | 30 | 100 | 1.0 |
| 55 | 90 | 90 | 30 | 100 | 2.0 |
| 56 | 50 | 50 | 30 | 60 | 4.5 |
| 57 | 70 | 70 | 30 | 80 | 1.5 |
| 58 | 90 | 90 | 30 | 100 | 2.0 |
| 59 | 90 | 90 | 30 | 100 | 2.0 |
| 60 | 90 | 90 | 30 | 100 | 8.0 |
| 61 | 90 | 90 | 30 | 100 | 2.0 |

TABLE V-continued

ZEOLITE A - REACTION CONDITIONS

| Example | Temps. °C. Silicate | Temps. °C. Aluminate | Time of Addition (sec.) | Reaction Temp. °C. | Reaction Time (Hrs.) |
|---|---|---|---|---|---|
| 62 | 70 | 70 | 30 | 80 | 1.5 |
| 63 | 50 | 50 | 30 | 60 | 4.0 |
| 64 | 90 | 90 | 30 | 100 | 0.5 |
| 65 | 90 | 90 | 30 | 100 | 2.0 |
| 66 | 90 | 90 | 30 | 100 | 4.0 |
| 67 | 90 | 90 | 30 | 100 | 1.5 |
| 68 | 90 | 90 | 30 | 100 | 1.5 |
| 69 | 90 | 90 | 300 | 100 | 1.5 |
| 70 | 90 | 90 | 600 | 100 | 1.5 |
| 71 | 90 | 90 | 1200 | 100 | 1.5 |
| 72 | 90 | 90 | 30 | 100 | 3.0 |
| 73 | 70 | 70 | 30 | 80 | 3.0 |
| 74 | 90 | 90 | 30 | 100 | 3.0 |
| 75 | 70 | 70 | 30 | 80 | 3.0 |
| 76 | 90 | 90 | 30 | 100 | 1.0 |
| 77 | 90 | 90 | 30 | 100 | 1.0 |
| 78 | 50 | 50 | 30 | 60 | 4.0 |
| 79 | 70 | 70 | 30 | 80 | 2.3 |
| 80 | 90 | 90 | 30 | 100 | 3.0 |
| 81 | 90 | 90 | 30 | 100 | 3.0 |
| 82 | 70 | 70 | 30 | 80 | 3.0 |
| 83 | 90 | 90 | 30 | 100 | 2.0 |
| 84 | 90 | 90 | 30 | 100 | 2.0 |
| 85 | 90 | 90 | 30 | 100 | 2.0 |
| 86 | 50 | 50 | 30 | 60 | 3.5 |
| 87 | 50 | 50 | 30 | 60 | 3.5 |
| 88 | 70 | 70 | 30 | 80 | 3.0 |
| 89 | 50 | 50 | 30 | 60 | 2.0 |
| 90 | 70 | 70 | 30 | 80 | 1.0 |
| 91 | 50 | 50 | 30 | 60 | 3.5 |
| 92 | 70 | 70 | 30 | 80 | 1.0 |

TABLE VI

EXCHANGE CAPACITY FOR ZEOLITE A

| Example | Silica/Alumina | Sodium Oxide/Alumina | % Alumina | Average Diameter | Calcium Capacity | Magnesium Capacity |
|---|---|---|---|---|---|---|
| 1 | 2.5 | 7.5 | 0.42 | 2.4 | 292 | 62 |
| 2 | 3.0 | 7.2 | 0.52 | 0.9 | 300 | 134 |
| 3 | 3.0 | 7.2 | 0.52 | 1.25 | 274 | 136 |
| 4 | 2.5 | 6.0 | 0.63 | 0.86 | 283 | 145 |
| 5 | 2.0 | 4.8 | 0.78 | 1.4 | 300 | 141 |
| 6 | 2.0 | 4.8 | 0.78 | 2.1 | 273 | 124 |
| 7 | 2.5 | 5.0 | 0.75 | 1.1 | 322 | 133 |
| 8 | 2.0 | 4.0 | 0.93 | 1.5 | 304 | 136 |
| 9 | 2.0 | 4.0 | 0.93 | 2.4 | 278 | 105 |
| 10 | 2.5 | 7.5 | 0.62 | 0.90 | 295 | 162 |
| 11 | 2.5 | 7.5 | 0.62 | 1.3 | 293 | 163 |
| 12 | 2.5 | 7.5 | 0.62 | 1.4 | 295 | 107 |
| 13 | 2.5 | 7.0 | 0.66 | 0.93 | 291 | 158 |
| 14 | 2.5 | 7.0 | 0.66 | 1.2 | 293 | 156 |
| 15 | 2.5 | 7.0 | 0.66 | 1.5 | 287 | 117 |
| 16 | 2.5 | 6.5 | 0.71 | 0.90 | 288 | 154 |
| 17 | 2.5 | 6.5 | 0.71 | 1.4 | 300 | 154 |
| 18 | 2.5 | 6.5 | 0.71 | 1.5 | 278 | 118 |
| 19 | 5.3 | 11.7 | 0.40 | 0.7 | 270 | 163 |
| 20 | 2.0 | 3.2 | 1.16 | 2.0 | 283 | 127 |
| 21 | 3.0 | 7.2 | 0.65 | 1.1 | 280 | 137 |
| 22 | 3.0 | 7.2 | 0.65 | 0.83 | 335 | 131 |
| 23 | 4.3 | 9.5 | 0.49 | 0.84 | 249 | 159 |
| 24 | 7.3 | 14.6 | 0.32 | 0.95 | 273 | 148 |
| 25 | 7.3 | 14.6 | 0.32 | 1.0 | 262 | 147 |
| 26 | 6.3 | 12.6 | 0.37 | 0.7 | 252 | 147 |
| 27 | 2.5 | 6.0 | 0.77 | 0.80 | 282 | 153 |
| 28 | 2.5 | 6.0 | 0.77 | 1.3 | 295 | 150 |
| 29 | 2.5 | 6.0 | 0.77 | 1.0 | 299 | 145 |
| 30 | 2.5 | 6.0 | 0.77 | 1.5 | 284 | 123 |
| 31 | 5.3 | 10.6 | 0.44 | 0.75 | 249 | 145 |
| 32 | 7.3 | 13.9 | 0.33 | 0.86 | 260 | 149 |
| 33 | 4.3 | 8.6 | 0.54 | 0.93 | 290 | 142 |
| 34 | 2.0 | 4.8 | 0.96 | 1.1 | 327 | 155 |
| 35 | 2.0 | 4.8 | 0.96 | 1.7 | 293 | 125 |
| 36 | 7.3 | 13.1 | 0.35 | 0.88 | 261 | 146 |
| 37 | 2.5 | 5.5 | 0.84 | 1.4 | 289 | 152 |
| 38 | 2.5 | 5.5 | 0.84 | 0.85 | 285 | 149 |
| 39 | 2.5 | 5.5 | 0.84 | 1.7 | 300 | 109 |
| 40 | 6.3 | 11.3 | 0.41 | 0.95 | 297 | 123 |
| 41 | 3.3 | 6.6 | 0.70 | 0.94 | 292 | 136 |
| 42 | 3.3 | 6.6 | 0.70 | 1.1 | 251 | 126 |
| 43 | 7.3 | 12.4 | 0.37 | 0.80 | 264 | 147 |
| 44 | 4.3 | 7.7 | 0.60 | 1.90 | 286 | 99 |
| 45 | 2.5 | 5.0 | 0.92 | 1.1 | 281 | 157 |
| 46 | 2.5 | 5.0 | 0.92 | 1.3 | 290 | 149 |
| 47 | 2.5 | 5.0 | 0.92 | 0.87 | 296 | 134 |
| 48 | 2.5 | 5.0 | 0.92 | 1.7 | 283 | 124 |
| 49 | 7.3 | 11.7 | 0.39 | 1.0 | 255 | 135 |
| 50 | 7.3 | 11.7 | 0.39 | 1.0 | 245 | 144 |
| 51 | 7.3 | 11.7 | 0.39 | 0.90 | 259 | 149 |
| 52 | 7.3 | 11.7 | 0.39 | 0.84 | 257 | 151 |
| 53 | 7.3 | 11.7 | 0.39 | 1.1 | 272 | 144 |
| 54 | 3.3 | 5.9 | 0.77 | 1.1 | 290 | 103 |

TABLE VI-continued
EXCHANGE CAPACITY FOR ZEOLITE A

| Example | Silica/ Alumina | Sodium Oxide/ Alumina | % Alumina | Average Diameter | Calcium Capacity | Magnesium Capacity |
|---|---|---|---|---|---|---|
| 55 | 5.3 | 8.5 | 0.54 | 0.92 | 255 | 150 |
| 56 | 2.0 | 4.0 | 1.15 | 1.3 | 297 | 140 |
| 57 | 2.0 | 4.0 | 1.15 | 2.0 | 293 | 115 |
| 58 | 7.3 | 11.0 | 0.42 | 0.9 | 256 | 145 |
| 59 | 7.3 | 11.0 | 0.42 | 1.1 | 249 | 127 |
| 60 | 6.3 | 9.5 | 0.49 | 0.95 | 273 | 127 |
| 61 | 6.3 | 9.5 | 0.49 | 1.1 | 234 | 123 |
| 62 | 2.5 | 4.5 | 1.02 | 1.2 | 287 | 157 |
| 63 | 2.5 | 4.5 | 1.02 | 1.0 | 281 | 149 |
| 64 | 2.5 | 4.5 | 1.02 | 1.7 | 281 | 113 |
| 65 | 5.3 | 8.0 | 0.58 | 1.1 | 250 | 118 |
| 66 | 7.3 | 10.2 | 0.45 | 1.5 | 254 | 143 |
| 67 | 3.3 | 5.3 | 0.87 | 1.2 | 265 | 145 |
| 68 | 3.3 | 5.3 | 0.87 | 1.5 | 248 | 136 |
| 69 | 3.3 | 5.3 | 0.87 | 1.4 | 264 | 128 |
| 70 | 3.3 | 5.3 | 0.87 | 1.4 | 254 | 127 |
| 71 | 3.3 | 5.3 | 0.87 | 1.7 | 239 | 92 |
| 72 | 6.3 | 8.8 | 0.52 | 1.6 | 307 | 145 |
| 73 | 3.0 | 4.8 | 0.96 | 1.95 | 292 | 135 |
| 74 | 5.3 | 7.4 | 0.62 | 1.4 | 278 | 148 |
| 75 | 2.5 | 4.0 | 1.14 | 1.2 | 288 | 160 |
| 76 | 2.5 | 4.0 | 1.14 | 2.0 | 278 | 86 |
| 77 | 3.3 | 4.6 | 0.99 | 1.3 | 272 | 121 |
| 78 | 2.0 | 3.2 | 1.42 | 1.2 | 311 | 118 |
| 79 | 2.0 | 3.2 | 1.42 | 2.2 | 300 | 119 |
| 80 | 7.3 | 8.8 | 0.52 | 1.6 | 241 | 144 |
| 81 | 6.3 | 7.6 | 0.60 | 1.4 | 300 | 144 |
| 82 | 2.5 | 3.5 | 1.30 | 1.3 | 286 | 145 |
| 83 | 2.5 | 3.5 | 1.30 | 1.9 | 288 | 112 |
| 84 | 4.3 | 5.2 | 0.88 | 1.2 | 290 | 148 |
| 85 | 3.3 | 4.0 | 1.14 | 1.6 | 274 | 153 |
| 86 | 2.5 | 6.0 | 1.01 | 0.92 | 315 | 157 |
| 87 | 2.0 | 4.8 | 1.25 | 1.4 | 289 | 140 |
| 88 | 2.5 | 3.0 | 1.50 | 1.6 | 273 | 134 |
| 89 | 2.0 | 4.0 | 1.49 | 0.97 | 275 | 145 |
| 90 | 2.5 | 4.0 | 1.48 | 1.2 | 274 | 129 |
| 91 | 1.6 | 3.2 | 1.85 | 1.4 | 312 | 143 |
| 92 | 1.6 | 3.2 | 1.85 | 1.8 | 279 | 155 |

A linear regression analysis was performed upon the above data, with correlation coefficients (r) calculated for certain variables. This analysis showed a definite correlation between magnesium exchange capacity and average particle size (r = −0.581). Based on this sample, there is less than a 1% probability that no correlation exists between these two variables. There is less than a 1% probability that there is no correlation between silica to alumina molar ratio and average particle size (r = −0.405); between sodium oxide to alumina molar ratio and average particle size (r = −0.469); and between alumina concentration and average particle size (r = +0.465). Thus, the average particle size and the magnesium exchange capacity can be controlled by adjusting either the silica to alumina molar ratio or the sodium oxide to alumina molar ratio or the alumina concentration.

TABLE VII
ZEOLITE A - PARTICLE CHARACTERISTICS

| Example | Average Particle Size Microns | Micron Range of at least 90% of Weight | Cumulative % Less Than One Micron | Other |
|---|---|---|---|---|
| 1 | 2.4 | 1.0–4.0 | 19 | Max 5% > 3.2μ |
| 2 | 0.9 | 0.1–2.0 | 96 | Max 5% > 1.25μ |
| 3 | 1.25 | 0.1–2.5 | 67 | Max 1% > 2.0μ |
| 4 | 0.86 | 0.1–1.6 | 92 | Max 1% > 2.0μ |
| 5 | 1.4 | 0.1–2.5 | 58 | Max 2% > 2.5μ |
| 6 | 2.1 | 0.1–4.0 | 35 | Max 5% > 2.5μ |
| 7 | 1.1 | 0.1–2.5 | 86 | Max 1% > 1.6μ |
| 8 | 1.5 | 0.1–2.5 | 58 | Max 1% > 2.5μ |
| 9 | 2.4 | 0.1–5.0 | 61 | Max 1% > 3.2μ |
| 10 | 0.9 | 0.1–2.0 | 92 | Max 1% > 1.6μ |
| 11 | 1.3 | 0.1–3.2 | 68 | Max 1% > 2.0μ |
| 12 | 1.4 | 0.1–2.5 | 56 | Max 1% > 2.5μ |
| 13 | 0.93 | 0.1–2.5 | 92 | Max 1% > 1.6μ |
| 14 | 1.2 | 0.1–2.5 | 73 | Max 1% > 2.0μ |
| 15 | 1.5 | 0.1–3.2 | 55 | Max 1% > 2.5μ |
| 16 | 0.9 | 0.1–2.5 | 93 | Max 1% > 1.6μ |
| 17 | 1.4 | 0.1–3.2 | 64 | Max 1% > 2.0μ |
| 18 | 1.5 | 0.1–3.2 | 53 | Max 1% > 2.5μ |
| 19 | 0.7 | 0.1–1.6 | 98 | Max 1% > 1.3μ |
| 20 | 2.0 | 0.1–4.0 | 39 | Max 1% > 3.2μ |
| 21 | 1.1 | 0.1–2.5 | 97 | Max 1% > 1.6μ |
| 22 | 0.8 | 0.1–1.6 | 95 | Max 1% > 1.6μ |
| 23 | 0.84 | 0.1–2.0 | 94 | Max 1% > 1.3μ |
| 24 | 0.95 | 0.1–2.0 | 96 | Max 1% > 1.3μ |
| 25 | 1.0 | 0.1–2.0 | 96 | Max 1% > 1.3μ |
| 26 | 0.7 | 0.1–2.0 | 98 | Max 1% > 1.3μ |
| 27 | 0.8 | 0.1–2.0 | 96 | Max 1% > 1.25μ |
| 28 | 1.3 | 0.1–2.5 | 71 | Max 1% > 2.0μ |
| 29 | 1.0 | 0.1–2.5 | 88 | Max 1% > 1.6μ |
| 30 | 1.5 | 0.1–3.2 | 55 | Max 1% > 2.5μ |
| 31 | 0.75 | 0.1–2.0 | 97 | Max 1% > 1.3μ |
| 32 | 0.86 | 0.1–2.0 | 96 | Max 1% > 1.3μ |
| 33 | 0.93 | 0.1–2.0 | 97 | Max 1% > 1.25μ |
| 34 | 1.1 | 0.1–2.0 | 83 | Max 1% > 2.0μ |
| 35 | 1.7 | 0.1–4.0 | 46 | Max 1% > 2.5μ |
| 36 | 0.88 | 0.1–2.0 | 96 | Max 1% > 1.3μ |

TABLE VII-continued
ZEOLITE A - PARTICLE CHARACTERISTICS

| Ex-am-ple | Particle Size Microns Average | Micron Range of at least 90% of Weight | Cumulative % Less Than One Micron | Other |
|---|---|---|---|---|
| 37 | 1.4 | 0.1–3.2 | 73 | Max 1% > 2.0μ |
| 38 | 0.85 | 0.1–2.5 | 94 | Max 1% > 1.6μ |
| 39 | 1.7 | 0.1–4.0 | 50 | Max 1% > 2.5μ |
| 40 | 0.95 | 0.1–2.0 | 97 | Max 1% > 1.3μ |
| 41 | 0.94 | 0.1–2.0 | 94 | Max 1% > 1.6μ |
| 42 | 1.1 | 0.1–2.0 | 82 | Max 1% > 1.6μ |
| 43 | 0.8 | 0.1–2.0 | 96 | Max 1% > 1.3μ |
| 44 | 0.9 | 0.1–2.0 | 97 | Max 1% > 1.6μ |
| 45 | 1.1 | 0.1–3.2 | 94 | Max 1% > 1.6μ |
| 46 | 1.3 | 0.1–3.2 | 77 | Max 1% > 2.0μ |
| 47 | 0.87 | 0.1–2.0 | 96 | Max 1% > 1.3μ |
| 48 | 1.7 | 0.1–4.0 | 54 | Max 1% > 2.5μ |
| 49 | 1.0 | 0.1–2.0 | 86 | Max 1% > 1.6μ |
| 50 | 1.0 | 0.1–1.6 | 80 | Max 1% > 1.6μ |
| 51 | 0.9 | 0.1–1.6 | 90 | Max 1% > 1.6μ |
| 52 | 0.84 | 0.1–1.6 | 95 | Max 1% > 1.6μ |
| 53 | 1.1 | 0.1–2.0 | 97 | Max 1% > 1.6μ |
| 54 | 1.1 | 0.1–2.5 | 86 | Max 1% > 2.0μ |
| 55 | 0.92 | 0.1–2.0 | 95 | Max 1% > 1.6μ |
| 56 | 1.3 | 0.1–3.2 | 71 | Max 1% > 2.0μ |
| 57 | 2.0 | 0.1–5.0 | 40 | Max 1% > 3.2μ |
| 58 | 0.9 | 0.1–2.0 | 96 | Max 1% > 1.6μ |
| 59 | 1.1 | 0.1–2.0 | 96 | Max 1% > 1.6μ |
| 60 | 0.95 | 0.1–2.5 | 95 | Max 1% > 1.6μ |
| 61 | 1.1 | 0.1–2.0 | 95 | Max 1% > 1.6μ |
| 62 | 1.2 | 0.1–3.2 | 80 | Max 1% > 2.0μ |
| 63 | 1.0 | 0.1–2.5 | 92 | Max 1% > 1.6μ |
| 64 | 1.7 | 0.1–4.0 | 56 | Max 1% > 2.5μ |
| 65 | 1.1 | 0.1–2.0 | 95 | Max 1% > 1.6μ |
| 66 | 0.9 | 0.1–2.0 | 97 | Max 1% > 1.6μ |
| 67 | 1.2 | 0.1–2.0 | 85 | Max 1% > 1.6μ |
| 68 | 1.5 | 0.1–3.2 | 53 | Max 1% > 2.5μ |
| 69 | 1.4 | 0.1–3.2 | 51 | Max 5% > 2.0μ |
| 70 | 1.4 | 0.1–3.2 | 54 | Max 4% > 2.0μ |
| 71 | 1.7 | 0.1–4.0 | 62 | Max 2% > 2.5μ |
| 72 | 1.1 | 0.1–3.2 | 91 | Max 1% > 2.0μ |
| 73 | 0.95 | 0.1–2.0 | 95 | Max 1% > 1.6μ |
| 74 | 1.4 | 0.1–3.2 | 95 | Max 1% > 1.6μ |
| 75 | 1.2 | 0.1–3.2 | 80 | Max 1% > 2.0μ |
| 76 | 2.0 | 0.1–5.0 | 48 | Max 1% > 3.2μ |
| 77 | 1.3 | 0.1–3.2 | 76 | Max 1% > 2.0μ |
| 78 | 1.2 | 0.1–3.2 | 76 | Max 1% > 3.2μ |
| 79 | 2.2 | 0.1–5.0 | 34 | Max 1% > 3.2μ |
| 80 | 1.6 | 0.1–4.0 | 80 | Max 5% > 1.6μ |
| 81 | 1.4 | 0.1–4.0 | 95 | Max 1% > 2.0μ |
| 82 | 1.3 | 0.1–3.2 | 79 | Max 1% > 2.0μ |
| 83 | 1.0 | 0.1–5.0 | 57 | Max 1% > 3.2μ |
| 84 | 1.2 | 0.1–3.2 | 86 | Max 1% > 2.0μ |
| 85 | 1.6 | 0.1–4.0 | 80 | Max 1% > 2.0μ |
| 86 | 0.92 | 0.1–2.0 | 98 | Max 1% > 1.25μ |
| 87 | 1.4 | 0.1–3.2 | 77 | Max 1% > 2.0μ |
| 88 | 1.6 | 0.1–4.0 | 71 | Max 1% > 2.5μ |
| 89 | 1.97 | 0.1–2.5 | 91 | Max 1% > 1.6μ |
| 90 | 1.2 | 0.1–3.2 | 95 | Max 1% > 1.6μ |
| 91 | 1.4 | 0.1–3.2 | 67 | Max 1% > 2.5μ |
| 92 | 1.8 | 0.1–4.0 | 53 | Max 1% > 2.5μ |

The following examples for preparation of small particle size zeolite A were carried out to illustrate the use of molar ratios of $SiO_2:Al_2O_3$ in the range of 1:1 to 1.5:1.

TABLE VIII
COMPOSITION OF REACTION MIXTURE FOR PREPARATION OF ZEOLITE A

| Example | Water/Sodium Oxide | Sodium Oxide/Silica | Silica Alumina | Silicate Solution % Na₂O | Silicate Solution % SiO₂ | Aluminate Solution % Na₂O | Aluminate Solution % Al₂O₃ |
|---|---|---|---|---|---|---|---|
| 93 | 15 | 1.6 | 1.5 | 10.6 | 25.8 | 17.4 | 15.9 |
| 94 | 25 | 1.6 | 1.5 | 5.5 | 13.4 | 14.9 | 13.6 |
| 95 | 15 | 2.4 | 1.5 | 8.3 | 20.2 | 19.8 | 10.8 |
| 96 | 25 | 2.4 | 1.5 | 3.3 | 8.2 | 19.8 | 10.8 |
| 97 | 20 | 2.4 | 1.0 | 6.2 | 15.3 | 15.9 | 13.0 |
| 98 | 20 | 2.0 | 1.0 | 8.5 | 20.8 | 13.9 | 14.2 |
| 99 | 25 | 2.4 | 1.0 | 4.0 | 9.8 | 15.9 | 13.0 |
| 100 | 25 | 2.0 | 1.0 | 5.2 | 12.8 | 13.9 | 14.2 |

TABLE IX
REACTION CONDITIONS - ZEOLITE A

| Example | Preheating Temp °C. Silicate | Preheating Temp °C. Aluminate | Time of Addition Sec | Reaction Temp. 20 C. | Reaction Time - Hrs |
|---|---|---|---|---|---|
| 93 | 70 | 70 | 30 | 80 | 1.5 |
| 94 | 50 | 50 | 30 | 60 | 6.0 |
| 95 | 50 | 50 | 30 | 60 | 3.5 |
| 96 | 50 | 50 | 30 | 60 | 4.0 |
| 97 | 50 | 50 | 30 | 60 | 5.0 |
| 98 | 50 | 50 | 30 | 60 | 6.5 |
| 99 | 50 | 50 | 30 | 60 | 5.0 |
| 100 | 50 | 50 | 30 | 60 | 7.0 |

TABLE X
PARTICLE CHARACTERIZATION - ZEOLITE A

| Example | Average Particle Size Microns | Micron Range of at least 90% of Weight | Cumulative % Less Than One Micron | Other |
|---|---|---|---|---|
| 93 | 2.2 | 0.1–5.0 | 58 | Max 1% > 3.2μ |
| 94 | 1.8 | 0.1–4.0 | 33 | Max 1% > 3.2μ |
| 95 | 1.7 | 0.1–4.0 | 44 | Max 1% > 2.5μ |
| 96 | 1.5 | 0.1–2.5 | 56 | Max 1% > 2.5μ |
| 97 | 1.2 | 0.1–2.5 | 74 | Max 1% > 2.5μ |
| 98 | 1.3 | 0.1–3.2 | 73 | Max 1% > 2.0μ |
| 99 | 1.1 | 0.1–2.5 | 82 | Max 1% > 2.0μ |
| 100 | 1.4 | 0.1–3.2 | 69 | Max 1% > 2.0μ |

TABLE XI
EXCHANGE CAPACITY FOR ZEOLITE A

| Example | Average Diameter μ | Calcium Capacity | Magnesium Capacity |
|---|---|---|---|
| 93 | 2.2 | 298 | 93 |
| 94 | 1.8 | 296 | 111 |
| 95 | 1.7 | 294 | 100 |
| 96 | 1.5 | 311 | 134 |
| 97 | 1.2 | 291 | 93 |
| 98 | 1.3 | 270 | 96 |
| 99 | 1.1 | 289 | 121 |
| 100 | 1.4 | 270 | 114 |

As may be seen from Examples 1 to 92, the following are preferred molar ratios for production of zeolite A at reaction temperatures of 60° to 100° C.:

| | |
|---|---|
| Water to Sodium Oxide | 15.0 to 30.0 |
| Sodium Oxide to Silica | 1.2 to 3.0 |

| | |
|---|---|
| Silica to Alumina | 2.0 to 7.3 |

In addition, Examples 93-100 illustrate a further preferred combination of conditions for production of small particle size zeolite A: using reaction temperatures of 60° to 80° C., reaction times of 1.5 to 7.0 hours, and the following molar ratios:

| | |
|---|---|
| Water to Sodium Oxide | 15.0 to 25.0 |
| Sodium Oxide to Silica | 1.6 to 2.4 |
| Silica to Alumina | 1.0 to 1.5 |

In Tables XII, XIII, XIV and XV, the following are examples for production of zeolites similar to zeolite X and characterization of the products.

Thereafter in Tables XVI, XVII, XVIII and XIX, are examples for preparation of zeolite mixtures similar to mixtures of zeolite A and zeolite X and characterization of the products. These tables also set forth the exchange capacities of the products.

TABLE XII
COMPOSITION OF REACTION MIXTURE FOR THE PREPARATION OF ZEOLITE X

| Example | Water/ Sodium Oxide | Sodium Oxide/ Silica | Silica/ Alumina | % Water | % Sodium Oxide | % Silica | % Alumina |
|---|---|---|---|---|---|---|---|
| 101 | 30 | 1.7 | 7.3 | 94.73 | 3.16 | 1.86 | 0.25 |
| 102 | 30 | 1.6 | 7.3 | 94.61 | 3.15 | 1.97 | 0.27 |
| 103 | 30 | 1.5 | 7.3 | 94.46 | 3.15 | 2.10 | 0.29 |
| 104 | 30 | 1.5 | 7.3 | 94.46 | 3.15 | 2.10 | 0.29 |
| 105 | 30 | 1.5 | 5.3 | 94.36 | 3.15 | 2.10 | 0.40 |
| 106 | 30 | 1.4 | 7.3 | 94.30 | 3.14 | 2.25 | 0.31 |

TABLE XIII
REACTION CONDITIONS - ZEOLITE X

| Example | Temperature °C. Silicate Solution | Temperature °C. Aluminate Solution | Time of Addition (sec) | Reaction Temp. °C. | Reaction Time (Hrs) |
|---|---|---|---|---|---|
| 101 | 90 | 90 | 30 | 100 | 8.0 |
| 102 | 90 | 90 | 30 | 100 | 6.0 |
| 103 | 90 | 90 | 30 | 100 | 8.0 |
| 104 | 90 | 90 | 30 | 100 | 8.0 |
| 105 | 90 | 90 | 30 | 100 | 8.0 |
| 106 | 90 | 90 | 30 | 100 | 8.0 |

TABLE XIV
ZEOLITE PARTICLE CHARACTERIZATION

| Example | Average Particle Size - Micron | Micron Range of at Least 90% of Weight | Cumulative % Less Than One Micron |
|---|---|---|---|
| 101 | 2.0 | 0.1–5.0 | 48 |
| 102 | 1.7 | 0.1–3.2 | 49 |
| 103 | 2.2 | 0.1–4.0 | 41 |
| 104 | 2.8 | 0.1–6.0 | 46 |
| 105 | 2.2 | 0.1–4.0 | 45 |
| 106 | 1.5 | 0.1–3.2 | 52 |

TABLE XV
EXCHANGE CAPACITY FOR ZEOLITE X

| Example | Silica/ Aluimina | Sodium Oxide/ Alumina | % Alumina | Average Diameter | Calcium Capacity | Magnesium Capacity |
|---|---|---|---|---|---|---|
| 101 | 7.3 | 12.4 | 0.25 | 2.0 | 244 | 135 |
| 102 | 7.3 | 11.7 | 0.27 | 1.7 | 227 | 140 |
| 103 | 7.3 | 11.0 | 0.29 | 2.2 | 228 | 139 |
| 104 | 7.3 | 11.0 | 0.29 | 2.8 | 209 | 136 |
| 105 | 5.3 | 8.0 | 0.40 | 2.2 | 225 | 140 |
| 106 | 7.3 | 10.2 | 0.31 | 1.5 | 235 | 155 |

TABLE XVI
COMPOSITION OF REACTION MIXTURE FOR THE PREPARATION OF ZEOLITE A AND ZEOLITE X

| Example | Water/ Sodium Oxide | Sodium Oxide/ Silica | Silica/ Alumina | % Water | % Sodium Oxide | % Silica | % Alumina |
|---|---|---|---|---|---|---|---|
| 107 | 30 | 2.0 | 7.3 | 95.03 | 3.17 | 1.58 | 0.22 |
| 108 | 30 | 1.9 | 7.3 | 94.94 | 3.17 | 1.67 | 0.23 |
| 109 | 30 | 1.8 | 7.3 | 94.84 | 3.16 | 1.76 | 0.24 |
| 110 | 30 | 1.7 | 6.3 | 94.69 | 3.16 | 1.86 | 0.30 |
| 111 | 30 | 1.7 | 5.3 | 94.64 | 3.16 | 1.86 | 0.35 |
| 112 | 30 | 1.6 | 6.3 | 94.57 | 3.15 | 1.97 | 0.31 |
| 113 | 30 | 1.7 | 5.3 | 94.51 | 3.15 | 1.97 | 0.37 |
| 114 | 30 | 1.5 | 5.3 | 94.36 | 3.15 | 2.10 | 0.40 |
| 115 | 30 | 1.5 | 3.3 | 94.14 | 3.14 | 2.09 | 0.63 |
| 116 | 30 | 1.5 | 2.5 | 93.95 | 3.13 | 2.09 | 0.84 |
| 117 | 30 | 1.5 | 2.5 | 93.95 | 3.13 | 2.09 | 0.84 |

TABLE XVII
REACTION CONDITIONS - ZEOLITES A & X

| Example | Temps. °C. Silicate | Temps. °C. Aluminate | Time of Addition (sec.) | Reaction Temp. °C. | Reaction Time (Hrs.) |
|---|---|---|---|---|---|
| 107 | 90 | 90 | 30 | 100 | 4.0 |
| 108 | 90 | 90 | 30 | 100 | 4.0 |
| 109 | 90 | 90 | 30 | 100 | 4.0 |
| 110 | 90 | 90 | 30 | 100 | 6.0 |
| 111 | 90 | 90 | 30 | 100 | 4.0 |
| 112 | 90 | 90 | 30 | 100 | 6.0 |
| 113 | 90 | 90 | 30 | 100 | 8.0 |
| 114 | 95 | 95 | 300* | 100 | 5.0 |
| 115 | 90 | 90 | 30 | 100 | 4.0 |
| 116 | 90 | 90 | 30 | 100 | 4.0 |
| 117 | 90 | 90 | 300 | 100 | 6.0 |

*Silicate and Aluminate Solutions Combined Simultaneously.

TABLE XVIII
ZEOLITES A & X - PARTICLE CHARACTERIZATION

| Example | Average Particle Size - Micron | Micron Range of at Least 90% of Weight | Cumulative % Less Than One Micron |
|---|---|---|---|
| 107 | 2.0 | 0.1–4.0 | 45 |
| 108 | 1.7 | 0.1–3.2 | 48 |
| 109 | 1.8 | 0.1–4.0 | 40 |
| 110 | 1.9 | 0.1–3.2 | 38 |
| 111 | 1.9 | 0.1–4.0 | 41 |
| 112 | 2.7 | 0.1–5.0 | 41 |
| 113 | 2.7 | 0.1–4.0 | 42 |
| 114 | 3.3 | 0.1–6.4 | 42 |
| 115 | 2.9 | 0.1–5.0 | 42 |
| 116 | 4.0 | 0.1–8.0 | 37 |

TABLE XVIII-continued

| ZEOLITES A & X - PARTICLE CHARACTERIZATION | | | |
|---|---|---|---|
| Example | Average Particle Size - Micron | Micron Range of at Least 90% of Weight | Cumulative % Less Than One Micron |
| 117 | 5.4 | 0.1–10.0 | 44 |

TABLE XIX

| EXCHANGE CAPACITY FOR A COMBINATION OF ZEOLITE A AND ZEOLITE X | | | | | | |
|---|---|---|---|---|---|---|
| Example | Silica/ Alumina | Sodium Oxide/ Alumina | % Alumina | Average Diameter | Calcium Capacity | Magnesium Capacity |
| 107 | 7.3 | 14.6 | 0.22 | 2.0 | 255 | 130 |
| 108 | 7.3 | 13.9 | 0.23 | 1.7 | 240 | 135 |
| 109 | 7.3 | 13.1 | 0.24 | 1.8 | 228 | 139 |
| 110 | 6.3 | 10.7 | 0.34 | 1.9 | 224 | 141 |
| 111 | 5.3 | 9.0 | 0.35 | 1.9 | 229 | 138 |
| 112 | 6.3 | 10.1 | 0.31 | 2.7 | 221 | 130 |
| 113 | 5.3 | 8.5 | 0.37 | 2.7 | 304 | 130 |
| 114 | 5.3 | 8.0 | 0.40 | 3.3 | 235 | 143 |
| 115 | 3.3 | 5.0 | 0.63 | 2.9 | 257 | 150 |
| 116 | 2.5 | 3.8 | 0.84 | 4.0 | 256 | 118 |
| 114 | 2.5 | 3.8 | 0.84 | 5.4 | 303 | 129 |

The following examples illustrate activation of the silicate solution with alumina.

EXAMPLE 118

A sodium silicate solution of composition 3.4% sodium oxide and 8.5% silica was activated with 600 ppm alumina from a sodium aluminate solution. At a temperature of 70° C., a sodium aluminate solution, also at 70° C., of composition 24.2% sodium oxide and 8.3% alumina, was added to the sodium silicate within thirty seconds. The resulting gel was broken down by agitation until a homogeneous slurry was obtained. The batch was then reacted at 80° C. for 2.5 hours. The total batch composition had a water to sodium oxide molar ratio of 25:1, a sodium oxide to silica molar ratio of 2:1 and a silica to alumina molar ratio of 3:1. The resulting product was zeolite A which exhibited a calcium ion exchange capacity of 277 and magnesium ion exchange capacity of 175. The resulting zeolite particles exhibited a narrow differential weight percent gaussian distribution with an average particle size of 1.1 microns with at least 90% of the weight between 0.1 and 2.0 microns. The cumulative percent population exhibited 78% less than one micron, with no more than 2% greater than 1.6 microns.

EXAMPLE 119

A sodium silicate solution of composition 4.0% sodium oxide and 10.0% silica was activated with 600 ppm alumina from a sodium aluminate solution. At a temperature of 70° C., a sodium aluminate solution, also at 70° C., of composition 25.6% sodium oxide and 7.5% alumina, was added to the sodium silicate within thirty seconds. The resulting gel was broken down by agitation until a homogeneous slurry was obtained. The batch was then reacted at 80° C. for 22 hours. The total batch composition had a water to sodium oxide molar ratio of 30:1, a sodium oxide to silica molar ratio of 1:2 and a silica to alumina molar ratio of 7:1. The resulting product was zeolite X which exhibited both a calcium ion exchange capacity at 252 and magnesium ion exchange capacity of 147. The resulting zeolite particles exhibited a narrow differential weight percent gaussian distribution with an average particle size of 2.0 microns with at least 90% of the weight between 0.1 and 3.2 microns. The cumulative precent population exhibited 52% less than one micron, with no more than 1% greater than 4.0 microns.

EXAMPLE 120

A sodium silicate solution of composition 3.6% sodium oxide and 9.0% silica was activated with 600 ppm alumina from a sodium aluminate solution. The sodium silicate was then heated to 70° C. for thirty minutes. At that time a sodium aluminate solution, also at 70° C., of composition 29.5% sodium oxide and 5.3% alumina, was added to the sodium silicate within thirty seconds. The resulting gel was broken down by agitation until a homogeneous slurry was obtained. The batch was then reacted at 80° C. for six hours. The total batch composition had a water to sodium oxide molar ratio of 25:1, a sodium oxide to silica molar ratio of 1.7:1 and a silica to alumina molar ratio of 7:1. The resulting product was a combination of 40% zeolite X and 60% zeolite A. This product exhibited a calcium ion exchange capacity of 284 and magnesium ion exchange capacity of 139. The resulting zeolite particles exhibited a narrow differential weight percent gaussian distribution with an average particle size of 0.8 microns with at least 90% of the weight between 0.1 and 3.2 microns. The cumulative precent population exhibited 90% less than one micron, with no more than 1% greater than 1.3 microns.

EXAMPLE 121

A sodium silicate solution of composition 11.2% sodium oxide and 27.15% silica was activated with 500 ppm alumina from a sodium aluminate solution. The sodium silicate was then heated to 90° C. for thirty minutes. At that time a sodium aluminate solution, also at 90° C., of composition 10.4% sodium oxide and 14.6% alumina was added to the sodium silicate within thirty seconds. The resulting gel was broken down by agitation until a homogeneous slurry was obtained. The batch was then reacted at 100° C. for 24 hours. The total batch composition had a sodium oxide to silica molar ratio of about 0.56:1, a silica to alumina molar ratio of about 7.8:; and a water to sodium oxide molar ratio of about 20:1. The resulting product was zeolite Y with a silica to alumina molar ratio of 5.2:1.

Thus, in operation, either zeolite X, zeolite A, a combination of the two, or zeolite Y can be formed by dissolving sand in a sodium hydroxide solution to form a sodium silicate solution, activating it with alumina, forming a sodium aluminate solution and quickly adding the sodium aluminate solution to the activated sodium silicate solution.

WATER SOFTENING COMPOSITIONS

As indicated above, the small particle size zeolites of the invention are useful in several areas. Thus, a water soluble softening composition can be formed containing a binding agent, a solubilizing agent, water and the zeolites of the present invention. Zeolite A, zeolite X or a combination of the two can be used. In these compositions, sodium silicate may be used as the binding agent, with the silica to sodium oxide ratio being between 1:1 and 3.3:1, preferably about 2.5:1 since that is the most common molar ratio found in detergent formulations. At least 1% sodium silicate is required to bind the bead, but more than 20% sodium silicate limits the amount of sodium silicate that can be added to the system without enough improvement in bead strength to justify the lower aluminosilicate levels. The most preferred binding agent would be a sodium polysilicate having a silica to sodium oxide ratio of 2.5:1. About 1% to 20% of a suitable solubilizing agent should be present including soluble sodium phosphates, carbonates, bicarbonates, tetraborates and sodium sulfate. The preferred solubilizing agent is sodium sulfate.

Some water is needed in the water softening bead. Otherwise the ion exchange capacity of the sodium silicate is reduced. In a preferred embodiment of the present invention, at least 66% by weight of an anhydrous basis of zeolite of this invention is added to 1 to 20% by weight of sodium sulfate and the remainder is water. This slurry is then dried with nozzle atomization in a spray dryer at inlet temperatures of below 540° C. to produce beads. If the beads are dried at a temperature of above 540° C. some ion exchange capacity can be lost.

DETERGENT COMPOSITIONS

A detergent composition can be formed containing a high magnesium exchange capacity. Zeolite A, zeolite X, or a combination of these zeolites of the invention are used in a preferred aspect by spraying a liquid surfactant onto the zeolite to form a free-flowing powder or pellets. Care must be taken not to exceed the absorbency limits of the pigment. The powder or pellets are then added to detergent formulations without further drying. The powder or pellets are dry blended into a dry detergent formulation.

The surfactant can be anionic, non-ionic or amphoteric although the surfactants include the higher alkyl aryl sulfonic acids and their alkali metal and alkaline earth metal salts such as, for example, sodium dodecyl benzene sulfonate, sodium tridecyl sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium diisopropyl naphthalene disulfonate and the like, as well as the alkali metal salts of fatty alcohol esters of sulfuric and sulfonic acids, the alkali metal salts of alkyl aryl (sulfothioic acid) esters and the alkyl thiosulfuric acid Non-ionic surface active compounds, such as those products produced by condensing one or more relatively lower alkyl alcohol amines, such as methanolamine, ethanolamine, propanolamine, with a fatty acid such as lauric acid, cetyl acid, tall oil fatty acid, abietic acid, to produce the corresponding amide may also be used. In addition, amphoteric surface active compounds such as sodium N-coco beta amino propionate, sodium N-tallow beta amino dipropionate, sodium N-lauryl beta iminodipropionate and the like may also be used.

The use of small particle size zeolite A was evaluated by substituting it for phosphate in basic detergent formulations. Washing tests were conducted in a terg-o-tometer, Model 7243, machine. Tests were run at 0.15% detergent concentration in 120 and 240 ppm hard water (Ca:Mg=2:1) at 120° F. A wash time of fifteen minutes at 125 rpm with two five-minute rinses was used. Detergency was determined on soiled test cloths of cotton, spun dacron, cotton/dacron with permanent press, and cotton shirting wash and wear. The detergency value was determined by using a Gardner Model XL-10 reflectometer to measure reflectance before and after washing. The results on Table XX indicate that small particle size zeolite A can replace phosphates in detergent formulations and may even improve overall detergency. This is particularly evident in the 240 ppm hardness test. It is believed that the favorable results obtained in these tests can be attributed to the ability of small particle size zeolite A to remove both calcium and magnesium ions from solution at extremely rapid rates.

TABLE XX

USE OF SMALL PARTICLE SIZE ZEOLITE A IN DETERGENTS

| FORMULATION | 120 ppm Hardwater #1 wt % | gms | 120 ppm Hardwater #2 wt % | gms | 240 ppm Hardwater #3 wt % | gms | 240 ppm Hardwater #4 wt % | gms |
|---|---|---|---|---|---|---|---|---|
| Sodium Tripolyphosphate | 25 | .375 | — | — | 25 | .375 | — | — |
| Small particle size Zeolite A (Example 35) | — | — | 25 | *.469 | — | — | 25 | *.469 |
| Richonate 45B | 12 | .18 | 12 | .18 | 12 | .18 | 12 | .18 |
| Richonal A | 5 | .075 | 5 | .075 | 5 | .075 | 5 | .075 |
| Condensate Co | 3 | .045 | 3 | .045 | 3 | .045 | 3 | .045 |
| Carboxymethylcellulose | 1 | .015 | 1 | .015 | 1 | .015 | 1 | .015 |
| Sodium Silicate | 15 | .225 | 15 | .225 | 15 | .225 | 15 | .225 |
| Sodium Sulfate | 39 | .585 | 39 | .585 | 39 | .585 | 39 | .585 |

| RESULTS - Test Cloth | 120 ppm Hardwater #1 % Improvement | 120 ppm Hardwater #2 % Improvement | 240 ppm Hardwater #3 % Improvement | 240 ppm Hardwater #4 % Improvement |
|---|---|---|---|---|
| Cotton | 32.8 | 39.0 | 33.4 | 34.1 |
| Spun Dacron | 3.0 | 15.8 | 10.7 | 42.4 |
| Cotton/Dacron permanent press | 17.8 | 17.2 | 18.8 | 20.2 |
| Cotton shirting wash and wear | 22.8 | 19.9 | 19.7 | 24.8 |
| % Total Detergency | 76.4 | 91.9 | 82.6 | 121.5 |

*Active basis

PAPER COMPOSITIONS

Paper compositions can also be formed containing zeolites of small and uniform size of this invention, including zeolite A, zeolite X, or a combination of the two. The use of small particle size zeolite A as a filler in fine paper was evaluated by adding it to various types of furnishes. These furnishes included both bleached and unbleached pulps. Handsheets of various basis weights and different types of pulp were made using a Nobel and Wood Sheet machine. Tests on these handsheets were done according to the following TAPPI (The American Pulp and Paper Institute) standards:

T-425m—Opacity of Paper
T-452m—Brightness of Paper and Paperboard
T-410m—Basis Weight of Paper and Paperboard.

Table XXI indicates that single pass retention of zeolite A is not dependent on size and that its retention is significantly higher than Hydrex, a registered trademark of the J. M. Huber Corporation, for an amorphous sodium magnesium aluminosilicate. This suggests that the mechanism of zeolite A retention is different and showed markedly better optical effects in both brightness and opacity than commercial zeolite A and was equal to the best known synthetic (Hydrex) used for this application.

TABLE XXI
USE OF SMALL PARTICLE SIZE ZEOLITE A AS A FILLER IN FINE PAPER

| PIGMENT | % FILLER | BASIS WT. 25 × 38 × 500 #/REAM | g/sq m | % PIGMENT RETAINED | TAPPI BRIGHTNESS | TAPPI OPACITY |
|---|---|---|---|---|---|---|
| Unfilled |   | 50.9 | 75.3 |    | 85.0 | 82.8 |
| Small Particle Size | 3 | 52.1 | 77.1 | 58 | 86.7 | 86.5 |
| Zeolite A | 6 | 50.2 | 74.3 | 55 | 88.2 | 89.0 |
| (Example 10) | 9 | 51.3 | 75.9 | 53 | 89.3 | 90.6 |
| Commercial | 3 | 50.8 | 75.2 | 56 | 85.6 | 84.6 |
| Zeolite A | 6 | 52.2 | 77.3 | 55 | 86.1 | 86.1 |
|   | 9 | 53.5 | 79.2 | 56 | 86.5 | 87.2 |
| Unfilled |   | 48.9 | 72.4 |    | 85.5 | 82.2 |
| Small Particle Size | 3 | 51.5 | 76.2 | 41 | 87.4 | 86.1 |
| Zeolite A | 6 | 51.3 | 75.9 | 38 | 88.8 | 88.5 |
| (Example 10) | 9 | 51.4 | 76.1 | 34 | 89.9 | 90.1 |
| Hydrex* | 3 | 50.1 | 74.1 | 28 | 87.4 | 86.1 |
|   | 6 | 50.2 | 74.3 | 30 | 88.7 | 88.2 |
|   | 9 | 49.8 | 73.3 | 31 | 89.6 | 89.4 |

*Registered Trademark of J. M. Huber Corporation

The use of small particle size zeolite A of this invention as an extender for titanium dioxide in paper was evaluated by adding it to a bleached pulp paper furnish. The paper furnish was 50% bleached hardwood and 50% bleached softwood Kraft. Handsheets were made and the properties were tested following the previously described procedures. Table XXII shows the single pass retention of zeolite A in combination with titanium dioxide. This data also suggests a different mechanism of retention and confirms the results obtained in a single filler system. Optical properties obtained using small particle size zeolite A were significantly better than larger size material (commerical zeolite A) and equal to Hydrex.

that it is functional to species rather than size. It is reasonable to suspect that the retention mechanism is due to a charge effect between the crystalline material and the pulp rather than mechanical effects. Surprisingly, the small particle size zeolite A of the present invention

TABLE XXII
USE OF SMALL PARTICLE SIZE ZEOLITE A AS AN EXTENDER FOR TITANIUM DIOXIDE IN FINE PAPER

| PIGMENT | FILLER | BASIS WT. 85 × 38 × 500 # REAM | g/sq m | RETAINED | BRIGHTNESS | OPACITY |
|---|---|---|---|---|---|---|
| Unfilled |   | 50.9 | 75.3 |    | 85.0 | 82.8 |
| 50% Small Particle Size | 3 | 50.6 | 74.9 | 61 | 87.8 | 88.4 |
| Zeolite A | 6 | 51.0 | 75.5 | 58 | 89.6 | 91.9 |
| (Example 10) and 50% Titanium Dioxide | 9 | 50.7 | 75.0 | 55 | 90.8 | 93.8 |
| 50% Commerical | 3 | 50.5 | 74.7 | 59 | 87.2 | 87.7 |
| Zeolite A and | 6 | 51.3 | 75.9 | 60 | 88.7 | 91.0 |
| 50% Titanium Dioxide | 9 | 51.4 | 76.1 | 60 | 89.7 | 92.9 |
| Unfilled |   | 48.9 | 72.4 |    | 85.5 | 82.2 |
| 50% Small Particle Size | 3 | 51.5 | 76.2 | 47 | 88.3 | 88.2 |
| Zeolite A | 6 | 51.0 | 75.5 | 42 | 89.8 | 91.4 |
| (Example 10) and 50% Titanium Dioxide | 9 | 50.3 | 74.4 | 40 | 90.9 | 93.4 |
| 50% Hydrex and | 3 | 50.3 | 74.4 | 24 | 88.3 | 88.5 |
| 50% Titanium | 6 | 49.9 | 73.9 | 36 | 89.8 | 91.7 |
| Dioxide | 9 | 49.5 | 73.3 | 39 | 90.9 | 93.5 |

The use of small particle size zeolite A as a filler in newsprint was evaluated by adding it to a standard newsprint furnish. Newsprint handsheets consisting of 65% groundwood and 35% semi-bleached Kraft paper were made using the Noble and Wood Sheet machine. The sheets were printed at a pick-up of 1.7 and 2.5g ink/sq. m using a Vandercook Proofing Press with a solid block and a 4 mil impression pressure. After 24 hours, brightness readings on the reverse side of printed and unprinted sheets were made. These were then plotted and results reported as strike-through values at 20g ink/sq. m (modified version of the Larocque strike-through test).

The data on Table XXIII also indicates that the retention mechanism of zeolite A is different than other specialty fillers commonly used for newsprint applications. The results also confirm that small particle size zeolite A is superior to commercial zeolite A and compares favorably with Zeolex 23, a registered trademark of the J. M. Huber Corporation, for an amorphous sodium aluminosilicate.

TABLE XXIII

USE OF SMALL PARTICLE SIZE ZEOLITE A IN NEWSPRINT

| PIGMENT | % RETENTION | % FILLER | Basis Wt. 24 × 36 × 500 #/REAM | g/sq m | Caliper MILS | MM | TAPPI BRIGHT-NESS | TAPPI OPACITY | S/T @ 2 g/2 m INK | S/T REDUCTION |
|---|---|---|---|---|---|---|---|---|---|---|
| Unfilled | | | 28.8 | 46.9 | 3.0 | 0.76 | 59.3 | 83.7 | 17.1 | |
| Small | 37 | 2 | 30.1 | 49.0 | 3.1 | .079 | 61.0 | 86.5 | 13.4 | 22 |
| Particle | | | | | | | | | | |
| Size | 35 | 4 | 30.4 | 49.5 | 3.1 | .079 | 62.3 | 88.0 | 10.4 | 39 |
| Zeolite A | | | | | | | | | | |
| Zeolex 23 | 29 | 2 | 28.8 | 46.9 | 3.0 | .076 | 60.2 | 84.8 | 13.1 | 23 |
| | 35 | 4 | 29.5 | 48.0 | 3.0 | .076 | 61.1 | 85.7 | 9.8 | 43 |
| Unfilled | | | 29.6 | 48.2 | 3.3 | .084 | 58.6 | 86.4 | 12.3 | |
| Commercial | 38 | 2 | 30.6 | 49.8 | 3.2 | .081 | 59.2 | 87.7 | 11.4 | 7 |
| Zeolite A | 43 | 4 | 31.3 | 50.9 | 3.2 | .081 | 59.6 | 88.8 | 10.6 | 14 |

The use of small particle size zeolite A in paper coatings was tested in various coating formulas. Two of these were as follows:

1. 
   87% Hydrasperse Clay
   5% Titanium dioxide
   8% Pigment
2. 
   92% Hydrasperse Clay
   8% Pigment.

These formulations were prepared at 58% solids using 16 parts per hundred binder level (75% starch—25% Latex) and were ground using a Cowles Dissolver. Paper used was a 32#base stock which was coated 13#/3300 sq. ft. using a Keegan Laboratory Trailing Blade Coater. All sheets were supercalendered 3 nips at 150 degrees Fahrenheit and 100 psig. Sheets were then checked for gloss, opacity and brightness using the following TAPPI standards:
T—480m Gloss of Paper
T—425m Opacity of Paper
T—452, Brightness of Paper and Paperboard.

The results of Table XXIV show small particle size zeolite A to be superior to commercial zeolite A. This is most obvious in better gloss development, but there is also significant improvement in both brightness and opacity when used as either an extender for titanium or as a filler. Similar effects were seen in tests on coated board.

TABLE XXIV

| Pigment | 75 degree Gloss, % | TAPPI Brightness | TAPPI Opacity |
|---|---|---|---|
| USE OF SMALL PARTICLE SIZE ZEOLITE A AS A TITANIUM DIOXIDE EXTENDER IN PAPER COATINGS (87% Hydrasperse Clay - 5% TiO₂ 8% Pigment) | | | |
| Small Particle Size Zeolite A (Example 10) | 64.9 | 71.1 | 90.9 |
| Commercial Zeolite A | 55.0 | 70.4 | 90.3 |
| USE OF SMALL PARTICLE SIZE ZEOLITE A AS A PIGMENT IN PAPER COATINGS (92% Hydrasperse Clay - 8% Pigment) | | | |
| Small Particle Size Zeolite A (Example 10) | 64.0 | 69.3 | 89.0 |
| Commerical Zeolite A | 55.9 | 68.1 | 88.5 |

RUBBER COMPOSITIONS

A rubber composition can be formed containing zeolite A, zeolite X, or a combination of the two, of this invention.

The rubbers (alternatively referred to herein as elastomers, which materials are unvulcanized) which can be employed in the invention include both natural and synthetic rubbers. Exemplary of suitable synthetic rubbers are styrene-butadiaene, butyl rubber, nitril rubber, polybutadiene, polyisoprene, ethylene propylene, acrylic, fluorocarbon rubbers, polysulfide rubbers and silicone rubbers. Mixtures of copolymers of the above synthetic rubbers can be employed alone or in combination with natural rubber. The preferred rubbers are nitrile rubber, styrene-butadiene rubber, natural rubber, polyisoprene, and mixtures thereof because they are most compatible with polyester fibers, although minor amounts of other rubbers can be included without adverse effects. U.S. Pat. No. 3,036,980 is incorporated by reference to show the formation of rubber compositions containing zeolites.

PLASTIC COMPOSITIONS

A plastic composition can be formed containing zeolites of small and uniform size. Either zeolite A, zeolite X, or a combination of the two, can be used.

NON-SETTLING FLATTING PIGMENT

The zeolite of this invention can also be used as non-settling flatting pigments. Either zeolite A, zeolite X, or a combination of the two, can be used.

Small particle size zeolite A was evaluated as a non-settling, flatting pigment in nitrocellulose lacquer and as a prime pigment extender in flat latex paint systems. Tests in the nitrocellulose lacquer system were conducted by adding the zeolite to a lacquer. The amount of zeolite used was equivalent to 10% by weight of vehicle solids. The lacquer and zeolite were blended together using a Hamilton Beach Model 936 Blender at 16,000 rpm for four minutes and the resulting mixture was then strained through a fine mesh paint strainer. Hegman grind was determined in the usual manner and the mixture was then drawn down on Leneta 5c paper panels using a #34 wire wound coatings application rod. The panels were dried at room temperature for 45 minutes under dust-free conditions in a vertical position. A Gardner multiangle gloss meter was used to determine gloss (60 degree head) and sheen (85 degree head) of the panels. Settling was evaluated using an accelerated test with an arbitrary scale of 0 (fail) to 10 (none) after 7 days at 120° F.

The results on Table XXV show that small particle size zeolite A was superior to commercial zeolite A in all categories, and the exceptional clarity of the lacquer containing small particle size zeolite A would be of significant value in specialty applications.

TABLE XXV
USE OF SMALL PARTICLE SIZE ZEOLITE A AS A NON-SETTLING, FLATTING PIGMENT IN NITROCELLULOSE LACQUER

| Sample | Hegman | 60° Gloss | 85° Sheen | Settling |
|---|---|---|---|---|
| Small Particle Size Zeolite A (Example 10) | 6.25 | 15 | 27 | 8 |
| Commercial Zeolite A | 6.00 | 33 | 71 | 1 |

The use of small particle size zeolite A as a prime pigment extender in flat latex paint systems was evaluated as follows:

Part I of the formulation was mixed, Part II of the formulation was then added and the entire mixture was blended for 10 minutes on a Cowles high speed mixer. The zeolite A was added at this time and dispersed for 5 minutes. The letdown (Part III) was then added to complete the formulation and mixed for an additional 5 minutes. The resulting paint was drawn down on Leneta 1B paper panels using a #34 wire wound coatings application rod. The panels were dried at room temperature under dust-free conditions in a vertical position. A Gardner multi-angle gloss meter was used to determine the gloss and sheen of the panels.

TABLE XXVI

| Formulation | Weight, gms #1 | Weight, gms #2 |
|---|---|---|
| Part I | | |
| Water | 200 | 200 |
| Cellosize OP-15000 | 0.5 | 0.5 |
| AP-95 | 2 | 2 |
| Daxad 30 | 8 | 8 |
| Ethylene Glycol | 17 | 17 |
| Super Ad It | 1 | 1 |
| Napco NDW | 1 | 1 |
| Part II | | |
| R-901 | 150 | 150 |
| Huber 70C | 100 | 100 |
| G-White | 150 | 150 |
| Small particle size Zeolite A (Example 10) | 60 | — |
| Commercial Zeolite A | — | 60 |
| Part III | | |
| Water | 183 | 183 |
| QP-15000 | 3 | 3 |
| AMP-95 | 3 | 3 |
| Texanol | 8 | 8 |
| Napco NDW | 2 | 2 |

TABLE XXVI-continued

| Formulation | Weight, gms #1 | Weight, gms #2 |
|---|---|---|
| Amsco 3011 | 264 | 264 |

TABLE XXVII
USE OF SMALL PARTICLE SIZE ZEOLITE A AS A PRIME PIGMENT EXTENDER IN FLAT LATEX SYSTEMS

| Sample | Brightness, YB | Contrast Ratio | 60° Gloss | 85° Sheen |
|---|---|---|---|---|
| Small Particle Size Zeolite A (Example 10) | 89.6 | 0.968 | 3 | 7 |
| Commercial Zeolite A | 87.6 | 0.958 | 3 | 4 |

The results on Table XXVII indicate that small particle size zeolite A performs better than commercial zeolite A as a prime pigment spacer in this paint system. This is evident by the brightness and contrast ratios which indicate that the small partical size zeolite A is significantly more efficient and better performing in optical properties.

Zeolite Y of this invention has been found to have particularly good adsorption characteristics as is demonstrated by the representative adsorption data in Table XXVIII.

TABLE XXVIII
ADSORBATE DATA FOR ZEOLITE Y

| Adsorbate | Pressure (mm. Hg) | Temperature (°C.) | Weight % Adsorbed |
|---|---|---|---|
| $H_2O$ | 25 | 25 | 35.2 |
| $CO_2$ | 700 | 25 | 26.0 |
| n-pentane | 200 | 25 | 14.9 |
| $(C_4F_9)_3N$ | 0.07 | 25 | 1.1 |
| $(C_4F_9)_3N$ | 1.5 | 50 | 21.4 |
| Krypton | 20 | −183 | 70.0 |
| Oxygen | 700 | −183 | 35.7 |

The foregoing data were obtained in the following manner:

Samples of zeolite Y which had been activated by dehydration at a temperature of approximately 350° C., under vacuum, were tested to determine their adsorptive properties. The adsorption properties were measured in a McBain-Baker adsorption system. The zeolite samples were placed in light aluminum buckets suspended from quartz springs. They were activated in situ, and the gas or vapor under test was then admitted to the system. The gain in weight of the adsorbent was measured by the spring extensions as read by a cathetometer. In Table XXVIII the pressure given for each adsorption is the pressure of the adsorbate. The term "weight % adsorbed" in the table refers to the percentage increase in the weight of the activated adsorbent.

As may be seen from the adsorption data in the table, activated zeolite Y can be employed to separate molecules having a critical dimension greater than that of heptocosafluorotributylamine from molecules having smaller critical dimensions. The critical dimension of a molecule is defined as the diameter of the smallest cylinder which will accomodate a model of the molecule constructed using the best available van der Waals radii, bond angles, and bond lengths.

A unique property of zeolite Y is its strong preference for polar, polarizable and unsaturated molecules, providing, of course, that these molecules are of a size and shape which permit them to enter the pore system. This is in contrast to charcoal and silica gel which show a primary preference based on the volatility of the adsorbate.

Zeolite Y is distinguished from other molecular sieve types, for example, zeolite X described in U.S. Pat. No. 2,882,244, by its exceptional stability toward steam at elevated temperatures. This is a property which makes zeolite Y particularly suitable for such processes as gas drying.

What is claimed is:

1. A rubber composition which contains a filler amount of a synthetic zeolite, said zeolite being present in the form of small particles said particles being similar to zeolite A in having the chemical formula of zeolite A but differing from zeolite A in having larger ports or pore diameters, having bimodal pore size distribution, and having an X-ray diffraction pattern depressed from that of a 4 micron zeolite a standard, said particles being formed by the reaction of sodium silicate and sodium aluminate when the preparative batch reaction mixture has a water to sodium oxide molar ratio of between 15:1 and 20:1; a sodium oxide to silica molar ratio of between 1.5:1 and 3.1:1; and a silica to alumina molar ratio of between 1.0:1 and 4.5:1, and wherein the particles exhibit a narrow differential weight percent guassian distribution with an average particle size of no more than about 1.6 microns with at least 90% of the weight between 0.1 and 3.2 microns in diameter, wherein the cumulative percent population exhibits at least 64% by weight less than one micron, with no more than 1% by weight greater than 2.0 microns in diameter, said particles having a surface area of greater than 10 m$^2$/g.

2. A rubber composition according to claim 1 wherein said zeolite particles are produced from a batch reaction mixture comprising sodium silicate and sodium aluminate, or sodium hydroxide mother liquor and an amorphous sodium alumino silicate, in total having a water to sodium oxide molar ratio of between 15:1 and 20:1; a sodium oxide to silicate molar ratio of between 1.5:1 and 3.1:1, and a silica to alumina molar ratio of between 1.0:1 and 4.5:1, wherein said mixture is reacted at a temperature of about 60 degrees Celsius to 120 degrees Celsius; wherein said molar ratios and reaction temperature are chosen from the values provided so as to produce zeolite particles of average particle size in microns of less than 1.6 in accordance with the following equation wherein ln is natural log:

| | |
|---|---|
| Average ln (Particle Size) = | A(N/S × S/A) + B(H/N × Temp/100) + C(S/A)$^3$ + D(S/A)$^2$ + E(H/N ÷ S/A) + F(S/A) + G(Temp/100)$^3$ + H(H/N ÷ N/S) + I(N/S)$^2$ + J(N/S ÷ S/A) + K | wherein:

H/N—Moles of H$_2$O ÷ moles Na$_2$O present in the batch;
N/S—Moles Na$_2$O ÷ moles SiO$_2$ present in the batch;
S/A—Moles SiO$_2$ ÷ moles Al$_2$O$_3$ present in the batch;
Temp—Reaction temperature in degrees Celsius at which the batch is held until crystallization is complete;
and A, B, C, D, E, F, G, H, I, J and K are constants having the following values:

| | |
|---|---|
| A = −0.14827 | F = −3.31907 |
| B = 0.11922 | G = −0.50955 |
| C = −0.03245 | H = 0.00532 |
| D = 0.59054 | I = 0.12626 |
| E = −0.10945 | J = −0.76339 |
| | K = 5.40831; | and provided further that said surface areas of greater than about 10 m$^2$/g are obtained by selecting said molar ratios and reaction temperature from the values provided so that the measured surface area is a function of synthesis conditions and is expressed mathematically by the following equation:

| |
|---|
| Surface area, m$^2$/g = A(H$_2$O/Na$_2$O) + B(Na$_2$O/SiO$_2$) + C(SiO$_2$/Al$_2$O$_3$)$^2$ + D(SiO$_2$/Al$_2$O$_3$)$^3$ + E(Temp)$^2$ + F(H$_2$O/Al$_2$O$_3$) + G(H$_2$O/Al$_2$O$_3$)$^2$ + H(H$_2$O/Al$_2$O$_3$)$^3$ + I(H$_2$O/Na$_2$O × Temp) + J(SiO$_2$/Al$_2$O$_3$ × Temp) + K(H$_2$O/Na$_2$O ÷ Na$_2$O/SiO$_2$) + L(H$_2$O/Na$_2$O ÷ SiO$_2$/Al$_2$O$_3$) + M(Na$_2$O/SiO$_2$ ÷ SiO$_2$/Al$_2$O$_3$) + N | wherein:

| | |
|---|---|
| A = −57.11009845 | H = 2.6067484 × 10$^{-5}$ |
| B = −113.11000549 | I = 0.13123613 |
| C = −65.39277171 | J = 1.86829830 |
| D = 4.76134125 | K = 33.33057224 |
| E = −0.04384689 | L = 14.30545704 |
| F = 9.69234350 | M = 93.07457393 |
| G = −0.02585795 | N = 233.29360457 |

H$_2$O=Total moles of H$_2$O in the batch
Na$_2$O=Total moles of Na$_2$O in the batch
SiO$_2$=Total moles of SiO$_2$ in the batch
Al$_2$O$_3$=Total moles of Al$_2$O$_3$ in the batch
Temp.=Temperature in degrees Celsius at which the batch is held until crystallization is complete.

3. A rubber composition according to claim 1 wherein the rubber is a natural or synthetic rubber.

4. A rubber composition according to claim 3 wherein the rubber is an elastomer.

5. A rubber composition according to claim 3 wherein the rubber is a natural rubber.

* * * * *